US012632871B2

(12) United States Patent
Sethi et al.

(10) Patent No.: US 12,632,871 B2
(45) Date of Patent: May 19, 2026

(54) METHOD AND SYSTEM FOR IMPROVING CUSTOMER EXPERIENCE BASED ON A DEVICE CONTEXT-DRIVEN RECOMMENDATION

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 18/066,801

(22) Filed: Dec. 15, 2022

(65) Prior Publication Data
US 2024/0202739 A1     Jun. 20, 2024

(51) Int. Cl.
*G06Q 30/016*        (2023.01)

(52) U.S. Cl.
CPC .................................. *G06Q 30/016* (2013.01)

(58) Field of Classification Search
CPC ........................... G06Q 30/015; G06Q 30/016
See application file for complete search history.

(56) References Cited

U.S. PATENT DOCUMENTS

| | | |
|---|---|---|
| 6,697,962 B1 | 2/2004 | Mccrory |
| 7,698,131 B2 | 4/2010 | Bennett |
| 7,970,720 B1 | 6/2011 | Heidenreich et al. |
| 8,577,016 B1 | 11/2013 | Duva et al. |
| 9,602,560 B1 | 3/2017 | Moody |
| 9,754,263 B1 | 9/2017 | Apple |

(Continued)

FOREIGN PATENT DOCUMENTS

| | | |
|---|---|---|
| CA | 2568137 A1 | 2/2007 |
| CA | 2793743 A1 | 7/2011 |

(Continued)

OTHER PUBLICATIONS

Gupta, Shubham. "A hybrid machine learning framework of gradient boosting decision tree and sequence model for predicting escalation in customer support." 2020 IEEE International Conference on Big Data (Big Data). IEEE, 2020. (Year: 2020).*

(Continued)

*Primary Examiner* — Brendan S O'Shea
(74) *Attorney, Agent, or Firm* — Chamberlain, Hrdlicka, White, Williams & Aughtry; Aly Z. Dossa

(57)        ABSTRACT

A method for managing a technical support (TS) conversation includes: obtaining, in response to a TS request from a user of a client device, a log file associated with an application executing on the client device, in which the TS request specifies a hardware component failure on the client device; analyzing the log file to extract relevant data; obtaining, based on the relevant data, a fix from a solution service, in which the fix includes a plurality of steps; analyzing the log file to make a first determination that a first step of the plurality of steps has previously been applied to the client device; and initiating, based on the first determination, display of a second step of the plurality of steps on a graphical user interface (GUI) accessible to a TS entity, in which the second step has not been applied to the client device.

11 Claims, 8 Drawing Sheets

(56) References Cited

U.S. PATENT DOCUMENTS

| | | | |
|---|---|---|---|
| 9,922,649 B1 | 3/2018 | Lore et al. | |
| 10,048,996 B1 | 8/2018 | Bell et al. | |
| 10,192,179 B1 | 1/2019 | Agarwal | |
| 10,410,219 B1 | 9/2019 | El-nakib | |
| 10,721,142 B1 | 7/2020 | Mathur et al. | |
| 10,956,822 B1 | 3/2021 | Kern et al. | |
| 11,436,642 B1 | 9/2022 | Podgorny et al. | |
| 11,461,787 B1 | 10/2022 | Riley | |
| 11,561,849 B1 | 1/2023 | Kairali et al. | |
| 12,154,118 B1* | 11/2024 | Khmelev | G06Q 30/016 |
| 2001/0047270 A1 | 11/2001 | Gusick et al. | |
| 2002/0022986 A1 | 2/2002 | Coker et al. | |
| 2003/0041088 A1 | 2/2003 | Wilson | |
| 2004/0162724 A1 | 8/2004 | Hill et al. | |
| 2005/0105712 A1 | 5/2005 | Williams et al. | |
| 2006/0010110 A1 | 1/2006 | Kim et al. | |
| 2006/0080107 A1 | 4/2006 | Hill et al. | |
| 2007/0276631 A1 | 11/2007 | Subramanian et al. | |
| 2008/0091829 A1 | 4/2008 | Spataro | |
| 2008/0152122 A1 | 6/2008 | Idan et al. | |
| 2009/0083246 A1 | 3/2009 | Coker et al. | |
| 2009/0228264 A1 | 9/2009 | Williams et al. | |
| 2010/0050074 A1 | 2/2010 | Nachmani et al. | |
| 2011/0055122 A1 | 3/2011 | Andreoli | |
| 2011/0071869 A1 | 3/2011 | Obrien et al. | |
| 2011/0118932 A1 | 5/2011 | Singh et al. | |
| 2011/0320228 A1 | 12/2011 | Kowalski | |
| 2012/0102371 A1 | 4/2012 | Tonouchi | |
| 2012/0185290 A1 | 7/2012 | Mueller | |
| 2013/0110520 A1 | 5/2013 | Cheyer et al. | |
| 2013/0268260 A1 | 10/2013 | Lundberg et al. | |
| 2014/0024348 A1* | 1/2014 | Hurst | G06Q 30/016 |
| | | | 455/414.1 |
| 2014/0067375 A1 | 3/2014 | Wooters | |
| 2014/0281739 A1 | 9/2014 | Tuffs | |
| 2014/0282257 A1* | 9/2014 | Nixon | G05B 15/02 |
| | | | 715/835 |
| 2014/0324276 A1 | 10/2014 | Weaks | |
| 2014/0324651 A1* | 10/2014 | Piepenbrink | G06Q 30/02 |
| | | | 705/34 |
| 2014/0337377 A1 | 11/2014 | De Assuncao et al. | |
| 2014/0344565 A1 | 11/2014 | Wu | |
| 2015/0088784 A1 | 3/2015 | Dhara et al. | |
| 2015/0127322 A1 | 5/2015 | Clark | |
| 2015/0180985 A1 | 6/2015 | Seibert | |
| 2015/0193429 A1 | 7/2015 | Bohra et al. | |
| 2015/0278534 A1 | 10/2015 | Thiyagarajan | |
| 2015/0310445 A1 | 10/2015 | Chan et al. | |
| 2016/0027019 A1 | 1/2016 | Michaelangelo et al. | |
| 2016/0055044 A1 | 2/2016 | Kawai et al. | |
| 2016/0132812 A1 | 5/2016 | Beasley et al. | |
| 2016/0171505 A1 | 6/2016 | Johri et al. | |
| 2016/0179928 A1 | 6/2016 | Alkov et al. | |
| 2016/0335252 A1 | 11/2016 | Brunet et al. | |
| 2016/0371756 A1 | 12/2016 | Yokel | |
| 2017/0011308 A1 | 1/2017 | Sun et al. | |
| 2017/0060995 A1 | 3/2017 | Boule et al. | |
| 2017/0068976 A1 | 3/2017 | Wawrzynowicz | |
| 2017/0109222 A1 | 4/2017 | Singh et al. | |
| 2017/0132060 A1 | 5/2017 | Nomura et al. | |
| 2017/0169325 A1 | 6/2017 | Mccord et al. | |
| 2017/0230312 A1 | 8/2017 | Barrett et al. | |
| 2017/0244809 A1* | 8/2017 | Chae | H04L 41/0869 |
| 2017/0270419 A1 | 9/2017 | Sánchez Charles et al. | |
| 2017/0350403 A1 | 12/2017 | Kelly et al. | |
| 2018/0007204 A1 | 1/2018 | Klein | |
| 2018/0012229 A1* | 1/2018 | Roberts | H04L 65/75 |
| 2018/0012231 A1 | 1/2018 | Sapoznik et al. | |
| 2018/0095814 A1 | 4/2018 | Patil | |
| 2018/0121929 A1* | 5/2018 | Cheng | G06Q 30/016 |
| 2018/0129785 A1 | 5/2018 | Pal | |
| 2018/0174020 A1 | 6/2018 | Wu | |
| 2018/0191903 A1 | 7/2018 | Yokel | |
| 2018/0278687 A1 | 9/2018 | Handa | |
| 2018/0285320 A1 | 10/2018 | Yang et al. | |
| 2018/0322509 A1 | 11/2018 | Walthers et al. | |
| 2018/0329768 A1 | 11/2018 | Bikumala et al. | |
| 2018/0349394 A1 | 12/2018 | Hu | |
| 2019/0108270 A1 | 4/2019 | Dunne et al. | |
| 2019/0163594 A1 | 5/2019 | Hayden et al. | |
| 2019/0196682 A1 | 6/2019 | Madafferi | |
| 2019/0228107 A1 | 7/2019 | Trim et al. | |
| 2019/0228296 A1 | 7/2019 | Gefen et al. | |
| 2019/0228315 A1 | 7/2019 | Xu et al. | |
| 2019/0236132 A1 | 8/2019 | Zhu et al. | |
| 2019/0268470 A1 | 8/2019 | Amir et al. | |
| 2019/0340249 A1 | 11/2019 | Connell, II | |
| 2019/0349321 A1 | 11/2019 | Cai et al. | |
| 2019/0355042 A1 | 11/2019 | Swierk et al. | |
| 2020/0013070 A1 | 1/2020 | Walthers et al. | |
| 2020/0027094 A1 | 1/2020 | Consalvo et al. | |
| 2020/0117531 A1 | 4/2020 | Sudharsana | |
| 2020/0133755 A1 | 4/2020 | Bansal et al. | |
| 2020/0184355 A1 | 6/2020 | Mehta | |
| 2020/0218492 A1 | 7/2020 | Farivar | |
| 2020/0240875 A1 | 7/2020 | Venkateswaran et al. | |
| 2020/0302018 A1 | 9/2020 | Turkkan et al. | |
| 2020/0311738 A1 | 10/2020 | Gupta et al. | |
| 2020/0364638 A1 | 11/2020 | Molloy et al. | |
| 2021/0103703 A1 | 4/2021 | Galitsky | |
| 2021/0109832 A1 | 4/2021 | Ladkani | |
| 2021/0136195 A1 | 5/2021 | Adibi et al. | |
| 2021/0157985 A1 | 5/2021 | Rotkop et al. | |
| 2021/0208971 A1 | 7/2021 | Srinivasan | |
| 2021/0209635 A1 | 7/2021 | Czajka et al. | |
| 2021/0264438 A1 | 8/2021 | Singh | |
| 2021/0319189 A1 | 10/2021 | Trehan | |
| 2021/0357598 A1 | 11/2021 | Li | |
| 2022/0019935 A1 | 1/2022 | Ghatage et al. | |
| 2022/0036175 A1 | 2/2022 | Krishnamurthy et al. | |
| 2022/0050733 A1 | 2/2022 | Selvaraju | |
| 2022/0066791 A1 | 3/2022 | Drury | |
| 2022/0067746 A1 | 3/2022 | Thakkar | |
| 2022/0068263 A1 | 3/2022 | Roy | |
| 2022/0094789 A1 | 3/2022 | Lau et al. | |
| 2022/0129257 A1 | 4/2022 | Touati et al. | |
| 2022/0172079 A1 | 6/2022 | Kalandyk et al. | |
| 2022/0172222 A1 | 6/2022 | Chin et al. | |
| 2022/0197725 A1 | 6/2022 | Liu | |
| 2022/0208188 A1 | 6/2022 | Yoffe et al. | |
| 2022/0215273 A1 | 7/2022 | Sethi et al. | |
| 2022/0308943 A1 | 9/2022 | Srinivasan et al. | |
| 2022/0394348 A1 | 12/2022 | Hatambeiki et al. | |
| 2022/0398383 A1 | 12/2022 | Sethi et al. | |
| 2022/0400060 A1 | 12/2022 | Sethi et al. | |
| 2023/0047346 A1 | 2/2023 | Daniel et al. | |
| 2023/0053913 A1 | 2/2023 | De Souza et al. | |
| 2023/0073644 A1 | 3/2023 | Thakkar et al. | |
| 2023/0120510 A1 | 4/2023 | Sesha | |
| 2023/0132116 A1 | 4/2023 | Sethi et al. | |
| 2024/0187836 A1 | 6/2024 | Ball | |

FOREIGN PATENT DOCUMENTS

| | | | |
|---|---|---|---|
| CA | 3052174 A1 | 2/2020 | |
| CA | 3206778 A1 | 8/2022 | |
| CA | 2867335 C | 9/2023 | |
| CN | 105493446 A | 4/2016 | |
| CN | 108415789 A | 8/2018 | |
| CN | 113127746 A | 7/2021 | |
| EP | 1873699 A1 | 1/2008 | |
| EP | 1602102 B1 | 12/2010 | |
| WO | 9858356 A2 | 12/1998 | |
| WO | 2009087489 A1 | 7/2009 | |
| WO | 2013151808 A1 | 10/2013 | |
| WO | 2014043623 A1 | 3/2014 | |
| WO | 2021050170 A1 | 3/2021 | |

OTHER PUBLICATIONS

Rall, Chris "Decision Trees—Hidden Hero of Contact Centers" ICMI.com Sep. 8, 2020; available at: https://www.icmi.com/resources/2019/decision-trees-hidden-hero-of-contact-centers (Year: 2020).*

(56)  References Cited

OTHER PUBLICATIONS

Dhoolia et al., "A cognitive system for business and technical support: a case study", 2017, IBM Journal of Research and Development, vol. 61, No. 1, paper 7, pp. 74-85 (Year: 2017).

Law et al., "An Integrated Case-Based Reasoning Approach for Intelligent Help Desk Fault Management", 1997, Expert Systems with Applications, vol. 13, No. 4, pp. 265-274 (Year: 1997).

Mark Granger, "ServiceNow products and services explained", <https://web.archive.org/web/20210420101531/https://www.nelsonfrank.com/insights/servicenow-products-services-explained>, Aug. 12, 2022 (10 pages).

Anonymous, "Cloud-Based Contact Center Market Next Big Thing / Major Giants Five9, CloudTalk, Talkdesk", M2 Presswire (Year: 2021).

Caporuscio Mauro et al., "Smart-troubleshooting connected devices: Concept, challenges and opportunities", Future Generation Computer Systems, Elsevier Science Publishers. Amsterdam, NL, vol. 111. Sep. 16, 2019, pp. 681-697 [retrieved on Sep. 16, 2019].

International Search Report and Written Opinion mailed May 8, 2023, issued in corresponding PCT Application No. PCT/US2023/010749.

Shannon Keown, "What Call Center Location is Right for You? (& Considerations)", Sep. 1, 2021.

Unknown, "Multi-Site Contact Centers—Can they work for your business?", May 13, 2021.

Rohit Ranchal et al., "Protection of Identity Information in Cloud Computing without Trusted Third Party", 2010 29th IEEE International Symposium on Reliable Distributed Systems, pp. 368-372 (5 pages).

Robbes Romain et al, Using contexts similarity to predict relationships, the Journal of Systems and Software, 18 pages, 2017.

Walid Maalej et al., "Using contexts similarity to predict relationships between tasks", The Journal of Systems and Software 128 (Year: 2017), Published by Elsevier Inc., pp. 267-284 (18 pages).

* cited by examiner

FIG. 1
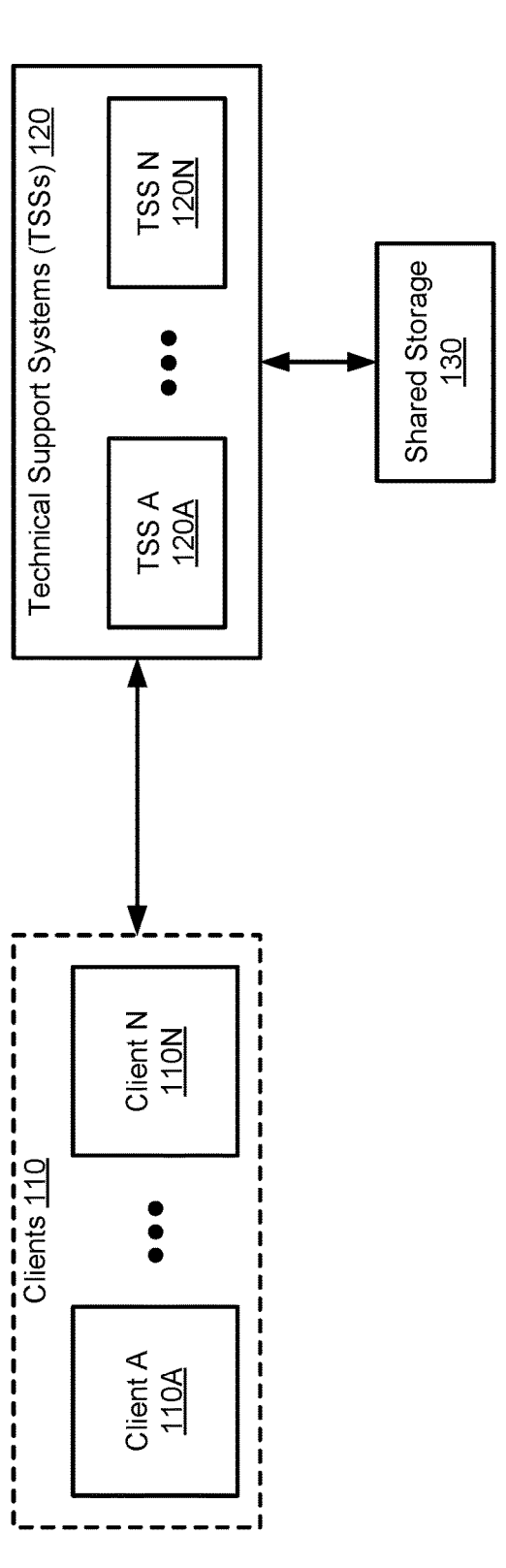
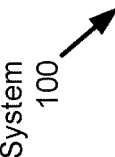
System
100

Technical Support System (TSS) 200

Analyzer
210

Recommendation
Engine 220

Checker 230

Storage
240

Visualization Module
250

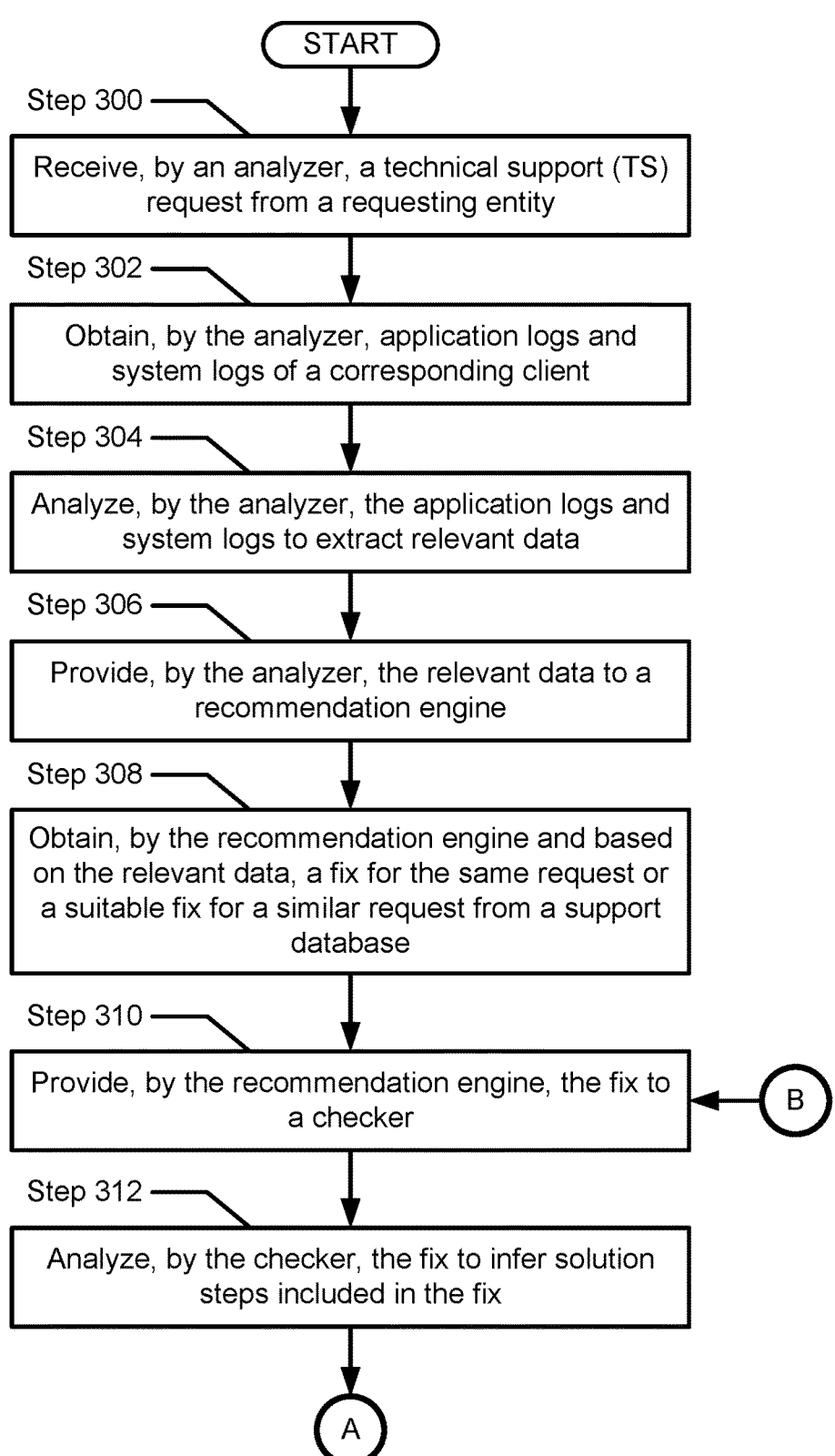
FIG. 3.1

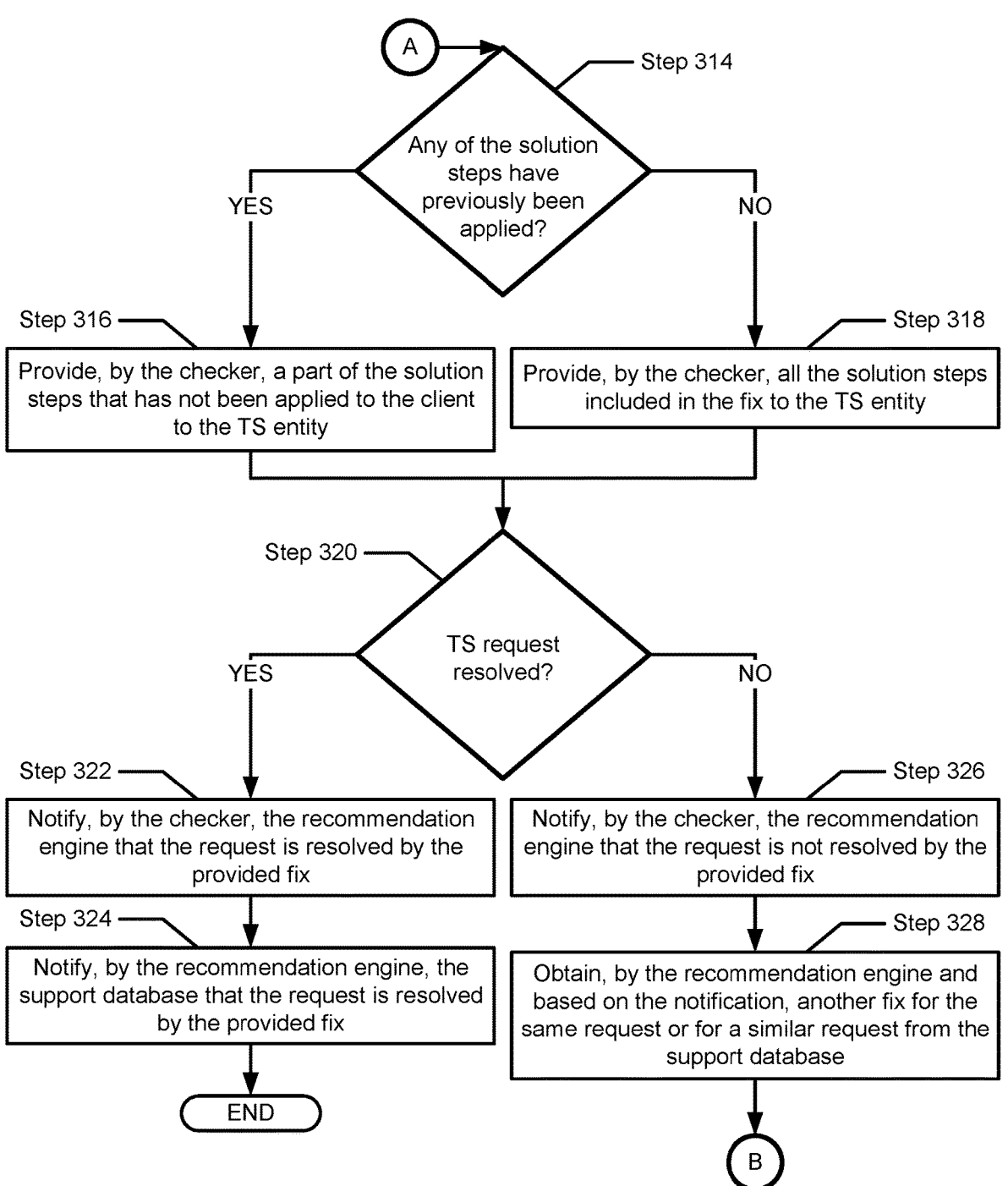
FIG. 3.2

| Time 0 | | [ TSS A receives a technical support (TS) request from Customer A ] |
|---|---|---|
| Time 1 | TS Specialist A | : | Thanks for reaching out to TS. How may I help you? |
| Time 2 | Customer A | : | I am unable to connect to my VPN. |
| Time 3 | TS Specialist A | : | Hello Customer A. I understand you are unable to connect to your VPN. |
| Time 4 | TS Specialist A | : | What is the error you are seeing? |
| Time 5 | Customer A | : | I do not see any error logs, my screen displays "unable to connect". Can you please tell me how to connect with the VPN? |
| Time 6 | TS Specialist A | : | What is your username? |
| Time 7 | Customer A | : | 12345Y. |
| Time 8 | TS Specialist A | : | I checked your account and could not see any issues. |
| Time 9 | Customer A | : | But I am unable to connect to my VPN!! |
| Time 10 | | [ TSS A obtains application logs and systems logs of Customer A's device. Based on the logs, TSS A obtains a fix for the same request from a support database. TSS A infers that the fix includes 4 steps and steps 1-2 have previously been applied to Customer A's device. For this reason, TSS A recommends steps 3-4 of the fix to TS Specialist A to resolve the TS request ] |
| Time 11 | TS Specialist A | : | Please update "VPN_driver_v1.dll" to the latest released version (step 3) and then restart your device (step 4). |
| Time 12 | | [ Customer A applies the recommended steps ] |
| Time 13 | TS Specialist A | : | Are you able to connect now? |
| Time 14 | Customer A | : | Yes, finally! Thanks for the help. |
| Time 15 | TS Specialist A | : | Great! Once again, thank you for reaching out. We look forward to helping you out more as and when you need it. Have a wonderful day! |

| Time 0 | [ Customer A sends a TS request to TSS A ] | |
|---|---|---|
| Time 1 | TS Specialist A | : Thanks for reaching out to TS. How may I help you? |
| Time 2 | Customer A | : I am unable to connect to my VPN. |
| Time 3 | TS Specialist A | : Hello Customer A. I understand you are unable to connect to your VPN. |
| Time 4 | TS Specialist A | : What is the error you are seeing? |
| Time 5 | Customer A | : I do not see any error logs, my screen displays "unable to connect". Can you please tell me how to connect with the VPN? |
| Time 6 | TS Specialist A | : What is your username? |
| Time 7 | Customer A | : 12345Y. |
| Time 8 | TS Specialist A | : I checked your account and could not see any issues. |
| Time 9 | Customer A | : But I am unable to connect to my VPN!! |
| Time 11 | TS Specialist A | : Please update "VPN_driver_v1.dll" to the latest released version and then restart your device. |
| Time 12 | [ Customer A applies the recommended steps ] | |
| Time 13 | TS Specialist A | : Are you able to connect now? |
| Time 14 | Customer A | : Yes, finally! Thanks for the help. |
| Time 15 | TS Specialist A | : Great! Once again, thank you for reaching out. We look forward to helping you out more as and when you need it. Have a wonderful day! |

600

METHOD AND SYSTEM FOR IMPROVING CUSTOMER EXPERIENCE BASED ON A DEVICE CONTEXT-DRIVEN RECOMMENDATION

BACKGROUND

Once computing devices are deployed, users (e.g., customers, legal entities, etc.) of these computing devices often encounter failures relate to the operation of these computing devices. In most cases, customers try to resolve these failures internally, but when they could not resolve these failures, they contact technical support (TS) entities to assist them in solving the failures with their computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1 shows a diagram of a system in accordance with one or more embodiments of the invention.

FIGS. 3.1 and 3.2 show a method for improving customer experience based on a computing device context-driven solution in accordance with one or more embodiments of the invention.

FIGS. 5.1 and 5.2 show an exemplary visual stream in accordance with one or more embodiments of the invention.

DETAILED DESCRIPTION

Figure 2:
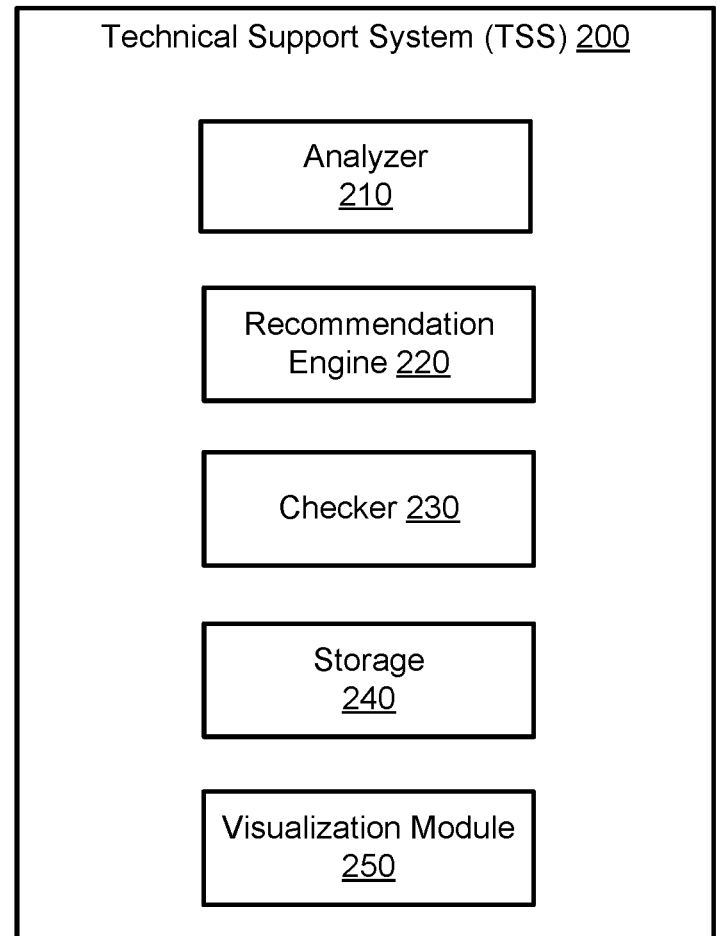
FIG. 2 shows a diagram of a technical support system (TSS) in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, customers (e.g., employees of an organization, external customers, etc.) reach out to a TS entity (e.g., a technical support specialist, a technical support personnel (TSP), a TSS, etc.) (i) to know about a particular service, (ii) to resolve (e.g., to address) a technical support issue (TSI) (e.g., a hardware issue, a software issue, a licensing issue, etc.), and/or (iii) to receive technical support (e.g., assistance). In order to reach out to a TS entity, customers may use chat support, voice support, and/or virtual assistance tools/channels.

Most of the customers reach out to TS entities when, for example, an issue starts to impact their production workloads (e.g., reading data from assets, writing data to the assets, etc.). Typically, when customers reach out to a TS entity, (i) they are in a hurry to get the issue resolved so that they can continue their operations/activities and (ii) they repeat "issue related" inquiries until the issue is resolved; however, repeated inquiries (and associated TS responses to those inquiries) make an ongoing TS conversation (e.g., an ongoing TS session) lengthy.

In most cases, when a customer reaches out to a TS entity because of an issue occurred in the customer's computing device, the TS entity may not be aware of a system configuration (e.g., an operating system (OS) configuration, memory configuration, etc.) and a system state of the customer's computing device. Typically, as a result of not being aware of the system configuration and system state of the customer's computing device, the TS entity may provide one or more solutions that are irrespective to the system configuration and system state of the customer's computing device. Because of that, the customer may leave the ongoing TS conversation with a bad experience and may not reach out to the TS entity again.

Embodiments of the invention relate to methods and systems to improve customer experience with a TS entity during an ongoing TS conversation. More specifically, the embodiments of the invention provide a proactive, runtime, and computing device context-based approach to analyze an ongoing TS conversation to manage a customer's experience with a TS entity. First, in response to a TS request from a customer of a computing device, a log file associated with an application executing on the computing device may be obtained. The log file may then be analyzed to extract relevant data. Based on the relevant data, a fix from a solution service may be obtained, in which the fix includes a one or more steps. Thereafter, the log file may be analyzed to make a determination that a first step of the steps has previously been applied to the computing device. Finally, based on the determination, displaying of a second step of the steps may be initiated on a graphical user interface (GUI) accessible to a TS entity, in which the second step has not been applied to the computing device. As a result of the processes discussed below, one or more embodiments disclosed herein advantageously ensure that the TS entity is aware of the system configuration and system state of the customer's computing device. In this manner, the ongoing TS conversation may be analyzed better in order to provide respective solutions to resolve the TS request and to improve the customer's experience with the TS entity.

The following describes various embodiments of the invention.

FIG. 1 shows a diagram of a system (100) in accordance with one or more embodiments of the invention. The system (100) includes any number of clients (110), any number of TSSs (120), and a shared storage (130). The system (100) may include additional, fewer, and/or different components without departing from the scope of the invention. Each component may be operably connected to any of the other components via any combination of wired and/or wireless connections. Each component illustrated in FIG. 1 is discussed below.

While FIG. 1 shows a specific configuration of the system (100), other configurations may be used without departing from the scope of the invention. For example, although the clients (110) and the TSSs (120) are shown to be directly connected (without an intervening network (not shown)), the clients (110) and the TSSs (120) may be operatively connected through a network. As yet another example, although the TSSs (120) and the shared storage (130) are shown to be directly connected, the TSSs (120) and the shared storage (130) may be executing on the same host.

Further, the functioning of the clients (110) and the TSSs (120) is not dependent upon the functioning and/or existence of the other device(s) in the system (100). Rather, the clients (110) and the TSSs (120) may function independently, and perform operations locally that do not require communication with other devices. Accordingly, embodiments disclosed herein should not be limited to the configuration of devices and/or components shown in FIG. 1.

In one or more embodiments, the system (100) may be a part of a technical support region (TSR) (not shown), in which the TSR corresponds to a geographic region (e.g., a city, a county, a state, a province, a country, a country grouping (e.g., the European Union), etc.). In order to facilitate sharing of information (e.g., data) between TSSs in various TSRs, the TSSs (120) may transmit information to a technical support hub (TSH) (not shown) and the TSH may distribute the information to other TSSs in other TSRs. In this configuration, the TSH may serve as a "hub in a hub-spoke architecture".

In another architecture, the TSH may maintain information received from the TSSs (120) and then transmits this information to the TSSs. The TSSs (120) may then communicate with other TSSs directly. In this configuration, the TSSs (120) may operate in a point-to-point architecture and rely on the TSH to discover other TSSs.

In one or more embodiments, a customer may need to contact (e.g., reach out to) a TS entity to address a TSI. The TSI may be related to a client (e.g., 110A, 110N, etc.) that the customer is using (e.g., interacting with) or related to another computing device (not shown) (logical or physical) that the customer is using. The TSI may be any issue that prevents (or impairs) the customer's ability to access and/or use, for example (but not limited to): the client, an application executing on the client, etc. The TSI may also be an issue that prevents one or more functionalities of the client (e.g., 110A, 110N, etc.).

In one or more embodiments, a client (e.g., 110A, 110N, etc.) may be a physical computing device or a logical computing device (e.g., a virtual machine (VM)) configured for hosting one or more workloads, or for providing a computing environment (e.g., computing power and storage) whereon workloads may be implemented. Further, a client (e.g., 110A, 110N, etc.) may correspond to a computing device that a customer is using to interact with a TSS (e.g., 120A, 120N, etc.).

In one or more embodiments, a workload (not shown) may refer to a physical or logical component configured to perform certain work functions. Workloads may be instantiated (e.g., initiated, executed, etc.) and may be operated while consuming computing resources (e.g., processing resources, networking resources, etc.) allocated thereto. Examples of a workload may include (but not limited to): a VM, a container, an application, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, a client (e.g., 110A, 110N, etc.) may include any number of applications (and/or content accessible through the applications) that provide application services to a customer. Application services may include, for example (but not limited to): database services, electronic communication services, instant messaging services, file storage services, etc. In order to provide application services, each application may host similar or different components. The components may be, for example (but not limited to): instances of databases, instances of email servers, etc. The applications may be executed on one or more clients as instances of the application.

As used herein, a "database" is an organized collection of unstructured and/or structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

As used herein, a "server" may provide computer-implemented services (e.g., receiving a request, sending a response to the request, etc.) to the customers. In one or more embodiments, the request may be, for example (but not limited to): a web browser search request, a computing request, a database management request, etc. To provide the computer-implemented services to the customers, the server may perform computations locally and/or remotely. By doing so, the server may utilize different computing devices (e.g., 600, FIG. 6) that have different quantities of computing resources (e.g., processing cycles, memory, storage, etc.) to provide a consistent customer experience to the customers.

Further, applications may vary in different embodiments, but in certain embodiments, applications may be custom developed or commercial (e.g., off-the-shelf) applications that a customer desires to execute in a client (e.g., 110A, 110N, etc.). In one or more embodiments, applications may be logical entities executed using computing resources of a client (e.g., 110A, 110N, etc.). For example, applications may be implemented as computer instructions, e.g., computer code, stored on a persistent storage of the client that when executed by a processor(s) of the client cause the client to provide the functionality of the applications described throughout this application.

In one or more embodiments, while performing, for example, one or more operations requested by a customer, applications installed on a client (e.g., 110A, 110N, etc.) may include functionality to request and use resources (e.g., data, computing resources, etc.) of the client. The applications may perform other types of functionalities not listed above without departing from the scope of the invention. In one or more embodiments, while providing application services to a customer, applications may store data that may be relevant to the customer in storage/memory resources (discussed below) of a client (e.g., 110A, 110N, etc.).

In one or more embodiments, the clients (110) may provide computer-implemented services to customers (and/ or other computing devices such as, other clients or other types of devices). The clients (110) may provide any number and any type of computer-implemented services (e.g., data storage services, electronic communication services, etc.). To provide computer-implemented services, each client (e.g., 110A, 110N, etc.) may include a collection of physical components (e.g., processing resources, storage/memory resources, networking resources, etc.) configured to perform operations of the client and/or otherwise execute a collection of logical components (e.g., applications, virtualization resources, etc.) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data in a client (e.g., 110A, 110N, etc.). Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in a client (e.g., 110A, 110N, etc.). The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of the client).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client (e.g., 110A, 110N, etc.) with external entities (e.g., other clients, the TSSs (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client (e.g., 110A, 110N, etc.) and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a client (e.g., 110A, 110N, etc.). The VM (and applications hosted by the VM) may generate data (e.g., VM data) that is stored in the storage/memory resources of the client, in which the VM data may reflect a state of the VM. In one or more embodiments, the VM may provide services to customers, and may host instances of databases, email servers, or other applications that are accessible to the customers.

In one or more embodiments, a virtualization resource may include a hypervisor, in which the hypervisor may be configured to orchestrate an operation of a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the client that when executed by processing resources of the client cause the client to provide the functionality of the hypervisor.

Figure 6:
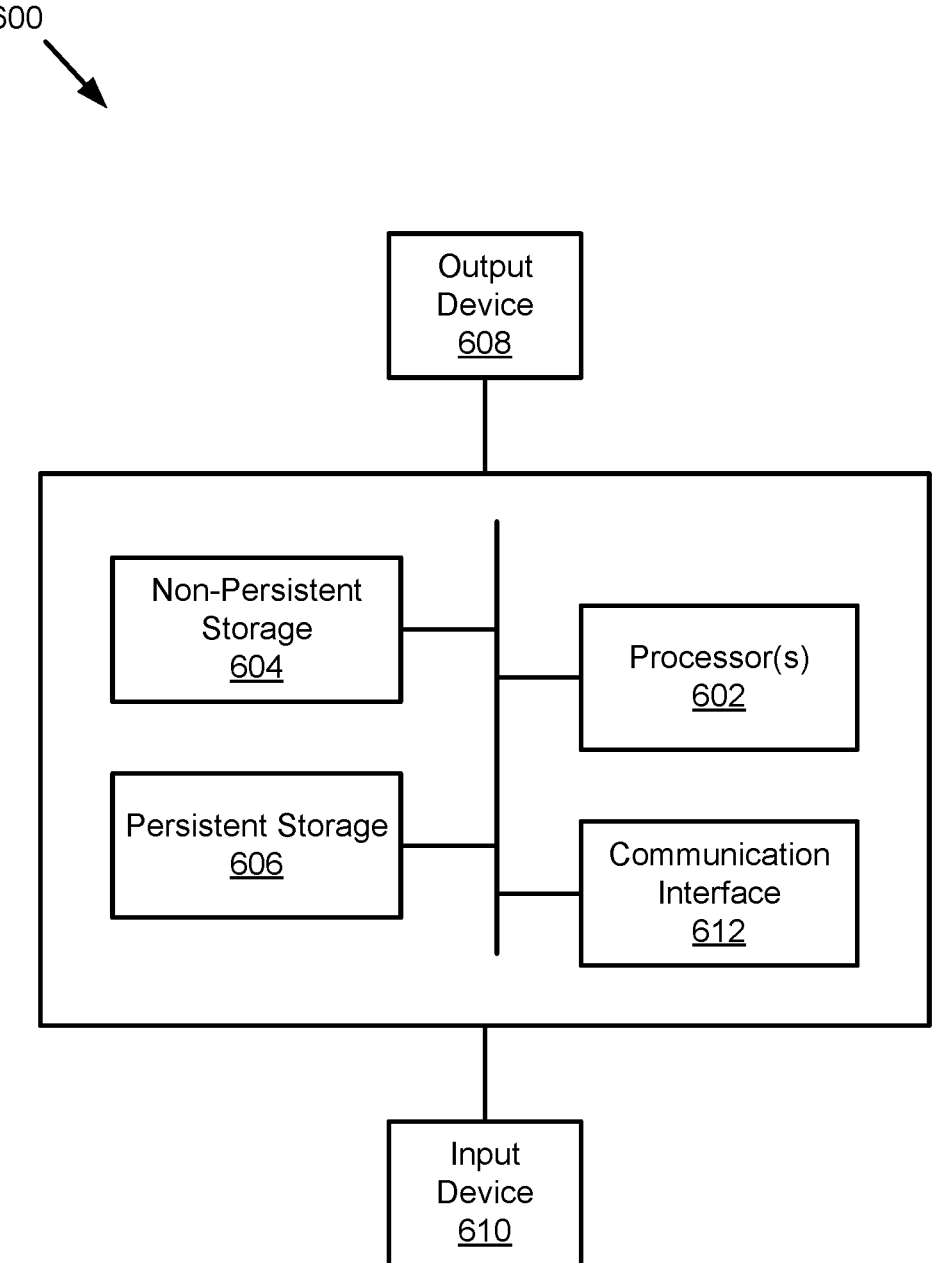
FIG. 6 shows a diagram of a computing device in accordance with one or more embodiments of the invention.

In one or more embodiments, the clients (110) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout this application.

Alternatively, in one or more embodiments, the clients (110) may be implemented as logical devices. A logical device may utilize the computing resources of any number of computing devices to provide the functionality of the clients described throughout this application.

In one or more embodiments, customers may interact with (or operate) the clients (110) in order to perform work-related tasks (e.g., production workloads). In one or more embodiments, the accessibility of customers to the clients (110) may depend on a regulation set by the administrators (e.g., a user with permission to make changes on a client that will affect other customers of that client). To this end, each customer may have a personalized customer account that may, for example, grant access to certain data, applications, and computing resources of the clients (110). This may be realized by implementing a "virtualization" technology. Virtualization allows for the generation of a VM that behaves as if it were a physical computing device with its own hardware components. When properly implemented, VMs on the same host (e.g., the client) are sandboxed from one another so that they do not interact with each other, and the data, applications, and computing resources from one VM are not visible to another VM even though they are on the same physical host.

In one or more embodiments, for example, a customer may be automatically directed to a login screen of a client (e.g., 110A, 110N, etc.) when the customer connected to that client. Once the login screen of the client is displayed, the customer may enter credentials (e.g., username, password, etc.) of the customer on the login screen. The login screen may be a GUI generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 600, FIG. 6) using functionalities of a display engine (not shown), in which the display engine is operatively connected to the computing device. The display engine may be implemented using hardware, software, or any combination thereof. The login screen may be displayed in any visual format that would allow the customer to easily comprehend (e.g., read and parse) the listed information.

In one or more embodiments, each of the TSSs (120) may refer to a system (either hosted by a TSP's computing device or by a third party entity) that is used by the TSP to interact with customers (via the clients (110)) in order to resolve TSIs. In one or more embodiments, the TSSs (120) may be configured to perform all, or a portion, of the functionality described in FIGS. 3.1 and 3.2. Additional details about the TSSs are described below in reference to FIG. 2.

In one or more embodiments, the TSSs (120) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the TSSs (120) described throughout this application.

Alternatively, in one or more embodiments, similar to the clients (110), the TSSs (120) may also be implemented as logical devices.

In one or more embodiments, the shared storage (130) (i) may be a storage or memory resource (discussed above) and (ii) may act as a support database (e.g., a solution service) that is functional to store unstructured and/or structured data. In one or more embodiments, the support database may store the unstructured and/or structured data in the form of a "solution (fix) tree" (see FIG. 4). The unstructured and/or structured data may include, for example (but not limited to): a service level agreement, an existing knowledge base (KB) article, a TS history documentation of a customer, recently obtained customer activity records, a cumulative history of customer activity records obtained over a prolonged period of time, a port's user guide, a port's release note, a community forum question and its associated answer, a user posted approximated port activation time, details of a remediative action that is applied to a previous hardware component failure, a version of a security fix, a version of an application upgrade, a TSS log, a model name of a hardware component, a catalog file of an application upgrade, details of a compatible OS version for an application upgrade to be installed, an application upgrade sequence, a solution or a workaround document for a software failure, a language setting of an OS, a serial number of a computing device, a hardware identification (ID) number of a hardware component, an identifier of a computing device's manufacturer, a product identifier of a hardware component, an identifier of a computing device, a setting of an application, a version of an application, a display resolution configuration required for an application, a product identifier of an application, etc. Additional details of the solution tree are described below in reference to FIG. 4.

In one or more embodiments, the unstructured and/or structured data may be updated (automatically) by third party systems (e.g., platforms, marketplaces, etc.) (provided by vendors) based on, for example, newer (e.g., updated) versions of application upgrades being available. The unstructured and/or structured data may also be updated when, for example (but not limited to): a newer version of an existing KB article is published, a support ticket (e.g., a reported incident) is resolved, a comment is received for a support ticket, a TSI is resolved by a provided solution (e.g., by a recommended fix), a TS request is not resolved by a provided solution, etc.

In one or more embodiments, the shared storage (130) is an example of a solution service. As discussed above, the solution service may be implemented as a support database; however, the solution service may also be implemented as any other computing device (e.g., 600, FIG. 6) (or a set of computing devices) that stores the unstructured and/or structured data. The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the solution service described throughout this application.

Alternatively, in one or more embodiments, similar to the clients (110), the solution service may also be implemented as a logical device.

In one or more embodiments, similar to the communication between a TSS (e.g., 120A, 120N) and the shared storage (130), the TSS (e.g., 120A, 120N) may also send a request to the solution service, and in return, the TSS (e.g., 120A, 120N) may receive a response from the solution service.

In one or more embodiments, the shared storage (130) may include an agent (not shown). The agent may be configured to: (i) generate a solution tree, (ii) derive a decision tree (see FIG. 4) from the solution tree, (iii) analyze the updated unstructured and/or structured data, and (iv) store them into the shared storage (130). Further, based on a context-aware search performed in the shared storage (130), the agent may provide an exact or the most relevant (e.g., suitable) solution, for example, for a hardware component failure. In one or more embodiments, agent may be implemented using hardware, software, or any combination thereof.

In one or more embodiments, the agent of the shared storage (130) may receive various TS history related inputs (e.g., TS history details of customers) from a TSP and/or from a TS session. Upon receiving, the agent may analyze those inputs to generate an index(es) (e.g., a TS session index(es)) for historical TS sessions included in the inputs, in which the index(es) may include, for example (but not limited to): information about a customer associated with a historical TS session, a keyword extracted from a historical TS session that relate to a TSI, a TSI tag (i.e., a keyword that identify a TSI issue that was a subject of a TS session) provided by a TSP, etc. The index(es) may also include other information that may be used to efficiently identify the historical TS sessions. In one or more embodiments, the aforementioned data may be stored as "TS session metadata" in the shared storage (130) with the corresponding TS sessions. In one or more embodiments, the TS session metadata may be stored in a native language and/or in a default language (discussed below).

In one or more embodiments, the shared storage (130) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the shared storage (130) described throughout this application.

Alternatively, in one or more embodiments, similar to the clients (110), the shared storage (130) may also be implemented as a logical device.

Turning now to FIG. 2. FIG. 2 shows a diagram of a TSS (200) in accordance with one or more embodiments of the invention. The TSS (200) may be an example of the TSS discussed above in reference to FIG. 1. The TSS (200) may include an analyzer (210), a recommendation engine (220), a checker (230), storage (240), and a visualization module (250). The TSS (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the analyzer (210) may include functionality to: (i) obtain application logs and system logs (including important keywords) from a client (e.g., 110A, FIG. 1), (ii) analyze the logs to extract relevant data (e.g., a version of an application, a version of an OS, etc.), and (iii) receive a TS correspondence(s) (e.g., request(s)) in real-time (e.g., on the order of milliseconds or less) or near real-time. The TS correspondence (e.g., the TS sentence, the customer sentence, etc.) may correspond to a question, an answer, or any other communication that is generated by a customer and sent to a TS entity as a part of a current (e.g., ongoing, live, etc.) TS session (see e.g., FIG. 5.1). One of ordinary skill will appreciate that the analyzer (210) may perform other functionalities without departing from the scope of the invention. The analyzer (210) may be implemented using hardware, software, or any combination thereof. For future log analysis and relevant data extraction purposes, the analyzer (210) may store the logs and extracted relevant data in the storage (240). Additional details of the analyzer are described below in reference to FIGS. 3.1 and 3.2.

In one or more embodiments, application logs may include, for example (but not limited to): a setting of an application, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In most cases, obtaining one or more settings of an application (as a log) may be important, for example, while searching for a proper solution (for a reported TSI) in the shared storage (e.g., 130, FIG. 1). For example, consider a scenario where application A needs to be upgraded from version 1.2 (v1.2) to v1.3 (as a solution to a TSI reported by a customer). In order to find a suitable (e.g., a compliant) v1.3 application upgrade package for application A in the shared storage (e.g., 130, FIG. 1), the agent of the shared storage (e.g., 130, FIG. 1) may need to know application settings of application A. Otherwise, application A may be upgraded to a non-compliant v1.3 and after the upgrade, whenever the customer needs to use application A, the customer may need to disable one of the application settings of application A to be able to perform a specific task.

In one or more embodiments, system logs may include, for example (but not limited to): a transition from one device state to another device state (e.g., fan failure→overheating of CPU, fan failure→memory module failure, etc.), an alert (e.g., a predictive alert, a proactive alert, a technical alert, etc.) triggered in a client, an important keyword (e.g., recommended maximum CPU operating temperature is 75° C.) related to a hardware component, an amount of storage used by an application, a language setting of an OS, a serial number of a client, a hardware ID number of a hardware component, an identifier of a client's manufacturer, a product identifier of a hardware component, a media access control (MAC) information of a client, a network connectivity information (e.g., a category of a network) of a client, an identifier of a client, a type of a client, a type of a file system (e.g., a new technology file system (NTFS), a resilient file system (ReFS), etc.), information related to a customer's CPU usage, information related to a newly detected universal serial bus (USB) device, etc.

In one or more embodiments, an alert may specify, for example (but not limited to): a medium level of DPU overheating is detected, a recommended maximum DPU operating temperature is exceeded, etc. In one or more embodiments, alerts may be defined by a vendor of that client, by the administrator, by another entity, or any combination thereof. The alerts may be defined based on a data protection policy.

In one or more embodiments, important keywords may be defined by a vendor of that client, by the administrator, by another entity, or any combination thereof. The important keywords may be specific technical terms or vendor specific terms that are used in system log files.

In one or more embodiments, a TS correspondence may be received in the form of digital audio data, text corresponding to a transcription of an audio signal (regardless of the type of audio signal), and/or text generated by a customer and sent, via a client (e.g., 110A, FIG. 1), to the analyzer (210). In one or more embodiments, while sending a TS correspondence, the client (e.g., 110A, FIG. 1) may use various different support channels (e.g., paths), for example (but not limited to): chat support channels, voice support channels, virtual support channels, etc.

In one or more embodiments, a TS correspondence may be generated on a client (e.g., 110A, FIG. 1) by encoding an audio signal in a digital form and then converting the resulting digital audio data into one or more TS correspondences. The conversion of the digital audio data into one or more TS correspondences may include applying an audio codec to the digital audio data, in order to compress the digital audio data prior to generating the TS correspondences. Further, the use of the audio codec may enable a smaller number of TS correspondences to be sent to the analyzer (210).

In one or more embodiments, the audio signal may be obtained from a customer speaking into a microphone on the client (e.g., 110A, FIG. 1). Alternatively, the audio signal may correspond to a pre-recorded audio signal that the customer provided to the client (e.g., 110A, FIG. 1) using conventional methods. In one or more embodiments, the client (e.g., 110A, FIG. 1) may receive the digital audio data directly instead of receiving an analog audio signal. In other embodiments, the audio signal may be computer generated.

In one or more embodiments, the audio signal may include one or more audio utterances. As used herein, an "audio utterance" may refer to a unit of speech bounded by silence. The utterance may be a word, a clause, a sentence, or multiple sentences. Further, a "text utterance" may refer to a unit of speech (in a text form) that is provided by a customer or a computing system, in which the unit of speech may be a word, a clause, a sentence, or multiple sentences. Embodiments of the invention may apply to both types of utterances. Unless otherwise specified, "utterance" means either an audio utterance, a text utterance, or a combination thereof.

In one or more embodiments, if a TS correspondence is an audio signal, the analyzer (210) may convert the audio signal into text using any known or later discovered speech-to-text conversion application (which may be implemented in hardware, software, or any combination thereof), in order to process the audio signal and extract relevant data from it. Thereafter, the analyzer (210) may store the extracted data temporarily (until an ongoing TS conversation is over) or permanently in the storage (240).

In one or more embodiments, even if the analyzer (210) may receive TS correspondences from a client (e.g., 110A, FIG. 1) in any format, the result of the processing of the received TS correspondences may be a text format of the TS correspondences. The text format of the TS correspondences may then be used by the other components (e.g., the visualization module (250)) of the TSS (200).

In one or more embodiments, once a TS correspondence is converted into a text format, the TS correspondence may be cleaned (e.g., by the analyzer (210)). Cleaning the TS correspondence may include identifying and correcting grammatical and/or punctuation mistakes. For example, the TS correspondence ("I does not see any error logs but it show 'Unable to connect'. Can you please tell me how to connect with the VPN.") may be corrected as ("I do not see any error logs but it shows 'Unable to connect'. Can you please tell me how to connect with the VPN?").

While not required, by cleaning TS correspondences prior to passing the TS correspondences to other components of the TSS (200), the other components of the TSS (200) may be able to more accurately process the TS correspondences to determine, for example, whether there are duplicate TS correspondences.

In one or more embodiments, the analyzer (210) may further include functionality to determine whether a pair of TS sentences (i.e., a TS sentence that was most recently received and a previously received TS sentence) are duplicative. To this end, the analyzer (210) may perform a duplication analysis on the TS sentence that was most recently received and all (or at least a portion) of the previously received TS sentences for the TS session. The result of processing the received TS sentence is an identification of zero, one, or more pairs of duplicative TS sentences. For example, the analyzer (210) may determine that the following TS sentences are duplicative (with varying confidence levels):

Customer: "Global VPN not working?"
Customer: "Can you please tell me how to connect with the VPN?"
Customer: "But I am unable to connect to Global VPN. Why?"
Customer: "But my VPN is not connecting. What should I do?"

For a future duplication analysis, the analyzer (210) may store these duplicative sentences (including the number of them) in the storage (240).

In one or more embodiments, in order to perform a duplication analysis, the analyzer (210) may be trained using any form of training data. In order to train, a set of linear, non-linear, machine learning (ML), natural language processing (NLP) models and/or other known or later discovered models may be employed. Further, the analyzer (210) may be updated periodically as there are improvements in the models and/or the models are trained using more appropriate training data.

In one or more embodiments, the analyzer (210) may generate values for one or more input parameters for a given pair of TS sentences for a TS session, and then uses them as input into a ML model (e.g., a Light Gradient Boosting Machine model). The result of processing the aforementioned input values using the model may be a binary result, indicating whether or not the two TS sentences are duplicative (i.e., similar to each other).

In one or more embodiments, the recommendation engine (220) may act as a "management layer" and may include functionality to: (i) receive relevant data from the analyzer (210), (ii) obtain, based on the relevant data, an exact or the most relevant (e.g., suitable) solution for a TSI from the shared storage (e.g., 130, FIG. 1), in particular, from a decision tree, (iii) manage (e.g., change) the course of an ongoing TS conversation (in a positive way) to provide a better customer experience, (iv) obtain feedback from the checker (230) (to determine whether the TS request is resolved by the provided solution), and (v) notify, based on the feedback, the shared storage (e.g., 130, FIG. 1) (in particular, the agent) whether the TS request is resolved (or not resolved) by the provided solution. Further, the recommendation engine (220) may store the provided solution (including its steps) in the storage (240) in order to (i) notify the shared storage (e.g., 130, FIG. 1) and (ii) provide it (and its steps) to the checker (230).

One of ordinary skill will appreciate that the recommendation engine (220) may perform other functionalities without departing from the scope of the invention. The recommendation engine (220) may be implemented using hardware, software, or any combination thereof. Additional details of the recommendation engine are described below in reference to FIGS. 3.1 and 3.2.

In one or more embodiments, the checker (230) may act as a "filtering layer" and may include functionality to: (i) determine whether the solution (obtained by the recommendation engine (220)) includes more than one solution step, (ii) analyze, based on (i), the log files (e.g., the customer's system state) to determine whether one of the solution steps has previously been applied to the client (e.g., 110A, FIG. 1), (iii) provide, based on (ii), a part of the solution steps that has not been applied to the client to a TS entity (e.g., filter a part of the solution steps that has been applied to the client before providing the solution to the TS entity), (iv) provide, based on (ii), all the solution steps included in the solution to the TS entity. (v) determine whether a TSI is resolved (or not resolved) by the provided solution, (vi) notify, based on (v), the recommendation engine (220) whether the TSI is resolved (or not resolved) by the provided solution, and (vii) change the course of an ongoing TS session (in a positive way) to provide a better customer experience. Further, the checker (230) may store the provided solution (including its steps) in the storage (240) in order to provide it (and its steps) to the TS entity.

One of ordinary skill will appreciate that the checker (230) may perform other functionalities without departing from the scope of the invention. The checker (230) may be implemented using hardware, software, or any combination thereof. Additional details of the checker are described below in reference to FIGS. 3.1 and 3.2.

In one or more embodiments, the TSS (200) may further include a TSP support module (not shown) that includes functionality to: (i) analyze TS sessions being conducted by a TSP, (ii) analyze historical TS sessions, and (iii) identify relevant historical TS sessions that may be use of the TSP in resolving an issue in a current TS session. Based on the analysis, the TSP support module may provide feedback to one or more TSPs to improve their TS session management skills (e.g., capabilities). In one or more embodiments, the TSP support module may be implemented using hardware, software, or any combination thereof.

In one or more embodiments, the storage (240) corresponds to any type of volatile or non-volatile (i.e., persistent)

storage device that includes functionality to store, for example, TS sentences and associated TSP responses (e.g., TSP sentences). For example, consider a scenario in which the following TS sentence is received by the TSS (200):

Customer: "Can you please tell me how to connect with the VPN?"

In response to this TS sentence, the TSP replies:

TSP: "Okay, I checked your account and see there are no issues with your account."

In the above-discussed example, both TS and TSP sentences are stored in the storage (240).

In addition to storing TS and TSP sentences (on a per-TS session basis), the storage (240) may also store, for example (but not limited to): information that identifies a TS session, a time stamp for a TS sentence, a time stamp for a TSP sentence, a locally-generated TS session (i.e., a TS session generated by a TSP using a local TSS), a remotely-generated TS session (i.e., a TS session generated by a TSP using a remote TSS), TS session metadata associated with a locally-generated TS session, TS session metadata associated with a remotely-generated TS session, an index to enable efficient identification and retrieval of content stored in the storage (240), etc. In one or more embodiments, the content may be stored in a native language and/or in a default language (discussed below).

In one or more embodiments, the storage (240) may maintain TS and TSP sentences for the duration of an associated TS session. The TS sentences (and, if stored, the associated TSP sentences) are maintained (or exported) and then used to train (or update the training of) the analyzer (210) so that, for example, the analyzer (210) may provide accurate speech-to-text conversion results.

In one or more embodiments, the storage (240) may be a storage or memory resource. Details of the storage or memory resource have been described above in reference to FIG. 1.

In one or more embodiments, while providing the above-discussed functionalities, the analyzer (210), the recommendation engine (220), and the checker (230) may store data (e.g., content) that may be relevant to the customer (e.g., customer-relevant content) in the storage (240). When customer-related content (simply "content") is stored, the content may be subjected to loss, inaccessibility, or other undesirable characteristics based on the operation of the storage (240). To mitigate, limit, and/or prevent such undesirable characteristics, an administrator of the TSS (200) may enter into agreements (e.g., service level agreements) with a provider of the storage (240). These agreements may limit the potential exposure of the content to undesirable characteristics. These agreements may, for example, require duplication of the content to other locations so that if the storage (240) fails, another copy (or other data structure usable to recover the data on the storage (240)) of the content may be obtained. These agreements may specify other types of activities to be performed with respect to the storage (240) without departing from the scope of the invention.

In one or more embodiments, the visualization module (250) may include functionality to: (i) receive TS sentences (or clean TS sentences) and corresponding TSP sentences, and display the aforementioned content on its GUI (which is the GUI of the TSS (200)) as a visual stream (see FIG. 5.1) that is ordered by time, (ii) visually indicate (highlight or link) duplicative TS sentences within the visual stream, and/or in a separate window(s) on the GUI (e.g., one per set of duplicative TS sentences), and (iii) enable the TSP to receive real-time or near real-time visual feedback on the TSS (200) while conducting a TS session. In one or more embodiments, the visualization module (250) may not modify a visual stream of a TS session; rather, the visualization module (250) may concurrently display one or more separate windows on the GUI that show the duplicative TS sentences and the corresponding TSP sentences.

In one or more embodiments, if a TSP is concurrently handling multiple TS sessions, then the visualization module (250) may perform the aforementioned functionality on a per TS session basis. Further, the visualization module (250) may include functionality to generate visualizations of methods illustrated in FIGS. 3.1 and 3.2.

One of ordinary skill will appreciate that the visualization module (250) may perform other functionalities without departing from the scope of the invention. Although the visualization module (250) is shown as part of the TSS (200), the visualization module (250) may also be implemented separately in the form of hardware, software, or any combination thereof.

In one or more embodiments, the TSS (200) may further include a translator (not shown). The translator is configured to: (i) translate locally-generated TS sessions from a native language of the TSS (200) to a default language and (ii) translate remotely-generated TS sessions from a default language to the native language of the TSS (200). In one or more embodiments, the native language of the TSS (200) is the language that a TSP uses in a TS session to communicate with a customer. Further, the default language corresponds to the language into which the content from the storage (240) is translated prior to being exported. A default language is used in order to have a common language while exporting content to other TSSs and while importing other content from other TSSs. By using a common language, individual TSSs may only need to translate between the default language and their native language, instead of being required to implement translation between any arbitrary language and a native language of a TSS. If the TSS' native language is the same as the default language, then the translator may not be utilized. In one or more embodiments, the translator may be implemented using hardware, software, or any combination thereof.

FIGS. 3.1 and 3.2 show a method for improving customer experience based on a computing device context-driven solution in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed analyzer (e.g., 210, FIG. 2), recommendation engine (e.g., 220, FIG. 2), and checker (e.g., 230, FIG. 2). Other components of the system (100) illustrated in FIG. 1 may also execute all or part of the method shown in FIG. 3.1 without departing from the scope of the invention.

In Step 300, the analyzer receives a TS request from a requesting entity (e.g., a customer). The customer may send the TS request because of a TSI occurred in a client (e.g., 110A, 110N, etc.) and/or an alert triggered in a client. In one or more embodiments, the TSI may be, for example (but not limited to): printed circuit board (PCB) failure, overheating of a DPU, etc. The alert may specify, for example (but not limited to): a maximum level of GPU overheating is detected, a recommended maximum GPU operating temperature is exceeded, etc.

In one or more embodiments, the TS request may include, for example (but not limited to): information related to a TSI, information related to a technical alert, information related to a customer (e.g., username of a customer, a product number of the customer's computing device, etc.), etc. In one or more embodiments, the analyzer may display the TS request to a TSP (or to another TS entity) via the GUI of the visualization module (e.g., 250, FIG. 2), which is the GUI of the TSS (e.g., 200, FIG. 2). The visualization module may display the TS request to the TSP in real-time or near real-time.

In one or more embodiments, upon receiving the TS request, the analyzer may generate a support ticket and identify one or more keywords from the TS request to generate a "TS request tag" specifying the subject of a soon-to-start TS session. The keywords may be identified by: (i) prompting the TSP to identify keywords, (ii) using a ML algorithm(s) to extract keywords from the TS request, and/or (iii) using (ii) to identify a set of keywords and then having the TSP confirm (or remove) the keywords that were identified to obtain a verified set of keywords. The keyword identification may be implemented using any combination of the above mechanisms and/or any other mechanisms without departing from the scope of the invention.

In Step 302, in response to the TS request (received in Step 300), the analyzer obtains application and system logs from the client. In one or more embodiments, as part of an ongoing TS session, if a received TS correspondence is an audio signal, the analyzer may first convert the audio signal into a text format to obtain the TS sentence. Thereafter, the TS sentence may be cleaned to obtain a cleaned TS sentence (if necessary). Once the TS sentence is cleaned (or after receiving an already clean TS sentence), the TS sentence may be provided to the visualization module to display as part of a visual stream. Details of the cleaning process are described above in reference to FIG. 2.

Further, after the cleaning (if it was performed), the analyzer may make a determination about whether the sentences are in a default language. As discussed above, in order to facilitate the sharing of the sentences (e.g., once the TS session is ended) between other TSSs, each TS session may be exported using a common language (referred to as the default language). To this end, if the sentences (and TS session metadata) are not in the default language, the analyzer may send a request to the translator to translate them into the default language (e.g., English).

Thereafter, by implementing a duplication analysis, the analyzer may determine whether a pair of the TS sentences (in the ongoing TS session) are duplicative. If this is the case, for a future duplication analysis, the analyzer may store these duplicative sentences (including the number of them) in the storage. For example, the analyzer may store the following TS sentences in the storage as duplicative sentences: "This is the third time I am reaching out to you. Help me!" and "Third time I am reaching out to you. Still no help!".

In one or more embodiments, while streaming (in real-time or near real-time) the ongoing TS session to the TSP, the visualization module may highlight the duplicative sentences (e.g., using a different color, using a different font, etc.) so that the TSP may act accordingly.

Thereafter, as part of the ongoing TS session, the analyzer may infer a status of the TS session based on, for example, a TS conversation score or a trending graph. For example, if the conversation score is increasing as the TS session continues, the graph may indicate "negative communication with the customer". As yet another example, if the conversation score is decreasing as the TS session continues, the graph may indicate "positive communication with the customer". In one or more embodiments, upon generating a trending graph (or a TS conversation score), the analyzer may display it to the TSP via the GUI of the TSS so that the TSP may act accordingly. The GUI may display the graph in real-time or near real-time.

In one or more embodiments, based on the status of the TS session (e.g., the conversation score is above a threshold (which means, so far, the TSP's approach to resolve the TS request is not working), the trending graph is indicating "negative communication with the customer", etc.), the analyzer may obtain the logs from the client. In one or more embodiments, in order to obtain the logs, the analyzer may make an application programming interface (API) call to an agent (not shown in FIG. 1) of the client. As used herein, an "API call" may refer to a process of an application or a computing device submitting a request to an API to retrieve the requested data from an external application or an external computing device.

Based on receiving the API call from the analyzer, the agent (of the client) may allow the analyzer to obtain the logs. Thereafter, the analyzer may store the logs in the storage (e.g., 240, FIG. 2) (temporarily or permanently) to extract relevant data from them (see Step 304). Certain exemplary details of the logs have been described above in reference to FIG. 2.

In Step 304, the analyzer analyzes the logs (obtained in Step 302) to extract relevant data. In one or more embodiments, the analyzer may employ a set of linear, non-linear, and/or ML models to extract relevant data. For this purpose, for example, the analyzer may execute an NLP model.

In one or more embodiments, in order to analyze the logs, the analyzer may be trained using any form of training data (e.g., application and system logs from previous TS sessions). In order to train, the above-mentioned models and/or other known or later discovered models may be employed. Further, the analyzer may be updated periodically as there are improvements in the models and/or the models are trained using more appropriate training data. Thereafter, the analyzer may store the relevant data in the storage (temporarily or permanently).

In one or more embodiments, the relevant data may include, for example (but not limited to): a version of an application, a version of an OS, a type of an OS, an identifier of an OS, a product identifier of an application, etc. The aforementioned example is not intended to limit the scope of the invention.

In Step 306, the analyzer provides the relevant data (extracted in Step 304) to the recommendation engine.

In Step 308, based on the relevant data and in order to manage an ongoing TS session, the recommendation engine obtains (i) a fix (e.g., a solution, an approach, etc.) for the same TS request (received in Step 300) or (ii) a suitable fix for a similar request from the shared storage. Said another way, the recommendation engine obtains an exact or the most relevant fix from the shared storage.

In one or more embodiments, a fix may correspond to a software fix(es) to be installed on the client, a script to be executed on the client, solution documents about how to modify hardware configuration of the client to address the TS request, or any combination thereof that the TSP needs to initiate (or follow) (i) in order to manage the ongoing TS session more properly and (ii) in order to resolve the TS request.

In one or more embodiments, before obtaining the exact fix (or the most relevant fix), the recommendation engine may obtain the TS request and TS request tag (related to the TS request) from the analyzer. Thereafter, in order to obtain the fix, the recommendation engine may make an API call (including the relevant data and information from the TS request and TS request tag) to the agent of the shared storage.

Based on receiving the API call from the recommendation engine and using the data provided with it, the agent may derive a "decision tree" (see FIG. 4) from the solution tree. Comparing to the decision tree, the solution tree is more generic and includes various different fixes for different customers (e.g., irrespective from which customer reached out to a TS entity) and different use cases (e.g., different TS requests). Said another way, the decision tree is more "customer-specific", and it is a subset of the solution tree that focuses only the customer's issue. Thereafter, the agent may perform a search within the decision tree to identify a fix that resolves the customer's issue specified in the TS request.

In one or more embodiments, the agent may perform the search using the index discussed above in reference to FIG. 1. As a result of the search, the agent may identify (or may not identify) the exact fix that is needed to resolve the customer's issue. If the agent could not identify the exact fix for the issue (e.g., because there is no fix available for this type of issue, because no other customer faced with this issue before, etc.), the agent may then use other information (e.g., parameters) available in the received relevant data (i) to perform an updated search and (ii) to identify the most relevant fix for the issue.

As a response to the API call, the agent may send the identified fix (either the exact fix or the most relevant fix) to the recommendation engine. Thereafter, the recommendation engine may store the fix, relevant data, information from the TS request, and TS request tag in the storage (temporarily or permanently). Based on the above, both the recommendation engine and agent may change the course of the ongoing TS session (in a positive way) to provide a better customer experience and to resolve the TS request.

In Step 310, the recommendation engine provides the fix (obtained in Step 308) to the checker.

In Step 312, upon receiving the fix from the recommendation engine, the checker analyzes the fix to infer one or more solution steps included in the fix. For example, consider a scenario where the checker infers the following six steps in the fix for a display resolution issue reported for application X: (i) download "res_v3.dll" upgrade package from the solution service, (ii) install the upgrade on the client, (iii) close all the applications executing on the client, (iv) restart the client, (v) after the restarting, only execute application X on the client, and (vi) after the execution, disable "versatile display mode" option in the display bar.

In one or more embodiments, the checker may employ a set of linear, non-linear, and/or ML models to infer the solution steps included in the fix. The checker may also store the provided fix (including its steps) in the storage in order to provide it (and its steps) to the TS entity.

Turning now to FIG. 3.2, the method shown in FIG. 3.2 may be executed by, for example, the above-discussed checker and recommendation engine. Other components of the system (100) illustrated in FIG. 1 may also execute all or part of the method shown in FIG. 3.2 without departing from the scope of the invention.

In Step 314, a determination is made as to whether any of the solution steps of the fix have previously been applied to the client. Accordingly, in one or more embodiments, if the result of the determination is YES, the method proceeds to Step 316. If the result of the determination is NO, the method alternatively proceeds to Step 318.

In one or more embodiments, first, the checker may obtain the logs from the analyzer (or in some cases, the checker may obtain a new set of logs from the client). Based on the logs (which includes information about the customer's system state), the checker determines whether one of the solution steps has previously been applied to the client. Considering the above-discussed example in reference to Step 312, the checker may determine that steps (i)-(ii) of the fix have previously been applied (for example, by the customer) to the client. In this case, as a filtering layer, the checker may only provide steps (iii)-(vi) of the fix to the TSP (see Step 316). Separately, considering the above-discussed example in reference to Step 312, the checker may determine none of the steps of the fix has previously been applied to the client. In this case, the checker may provide all the steps included in the fix to the TSP (see Step 318). In this manner (i.e., by filtering or not filtering the solution steps), the checker may change the course of the ongoing TS session (in a positive way) to provide a better customer experience and to resolve the TS request.

In Step 316, as a result of the determination in Step 314 being YES, the checker provides a part of the solution steps that has not been applied to the client to the TSP. In one or more embodiments, the checker may provide that part of the solution steps by displaying it (e.g., as a message) to the TSP via the GUI of the TSS. Considering the above-discussed example in reference to Step 312, the GUI may only display steps (iii)-(vi) of the fix to the TSP. The visualization module may display the message in real-time or near real-time so that the TSP may act accordingly. Said another way, the visualization module may display the message in real-time or near real-time in order to aid the TSP in successfully resolving the customer's issue (i.e., the TSI) in the ongoing TS session. In one or more embodiments, before displaying that part of the solution steps, that part of the solution steps may be translated from a native language to a default language, if necessary.

In one or more embodiments, in Step 308 of FIG. 3.1, the recommendation engine may also obtain more than one fix (e.g., fix 1, fix 2, etc.) from the agent of the shared storage. For example, based on the TS history of a different customer, the agent may provide fix 1 to the recommendation engine, because fix 1 was used to resolve a similar TSI reported at a previous point in time (and at that time, the customer's feedback for fix 1 was positive).

As yet another example, the agent may provide fix 2 to the recommendation engine, because fix 2 was used to resolve a similar TSI reported at a previous point in time (even though the customer's feedback for fix 2 was negative, the agent may still provide fix 2 because fix 2 may work for the current customer). As yet another example, if each customer's feedback was positive for fix 1 and fix 2, the agent may provide both fixes to the recommendation engine.

Based on the above-discussed examples and in addition to that part of the solution steps, the GUI may also display fix 1 and/or fix 2 (i.e., non-applied solution steps of fix 1 and/or fix 2) to the TSP. In this manner, in Step 320, the TSP may select the fix that (i) has the least turnaround time and (ii) requires the least resource (e.g., investment) intensive efforts.

In Step 318, as a result of the determination in Step 314 being NO, the checker provides all the solution steps included in the fix (obtained in Step 308 of FIG. 3.1) to the TSP. In one or more embodiments, the checker may provide all the solution steps by displaying them (as a message) to the TSP via the GUI of the TSS. Considering the above-discussed example in reference to Step 312, the GUI may display steps (i)-(vi) of the fix to the TSP. The visualization module may display the message in real-time or near real-time so that the TSP may act accordingly. Said another way, the visualization module may display the message in real-time or near real-time in order to aid the TSP in successfully resolving the customer's issue in the ongoing TS session. In one or more embodiments, before displaying all the solution steps, the steps may be translated from a native language to a default language, if necessary.

Based on the above-discussed examples in Step 316 and in addition to the solution steps of the fix, the GUI may also display fix 1 and/or fix 2 to the TSP. In this manner, in Step 320, the TSP may select the fix that (i) has the least turnaround time and (ii) requires the least resource-intensive efforts.

In Step 320, a second determination is made as to whether the TS request (e.g., the customer's issue) is resolved (e.g., whether the TS session was successful). Accordingly, in one or more embodiments, if the result of the determination is YES, the method proceeds to Step 322. If the result of the determination is NO, the method alternatively proceeds to Step 326.

In one or more embodiments, the TSP may select (e.g., follow) one of the fixes (and its provided steps) (e.g., the fix, fix 1, fix 2, etc.) from the GUI to change the course of the ongoing TS session (in a positive way) in order to provide a better customer experience. In this manner, the TS request may be resolved or the next TS sentence (in the ongoing TS session) may be more positive.

In one or more embodiments, if the result of the determination is YES, the customer may receive, for example, the following TSP sentence from the TSP: ("Once again, thank you for reaching out. We look forward to helping you out more as and when you need it. Have a wonderful day!"). Thereafter, the checker may make a determination that the TS session has ended. The determination may be made by prompting the TSP and/or the customer (in scenarios in which the customer provided feedback following the end of the TS session) to indicate whether the TS session was successful. The TS session may be determined to be successful if the TSP and/or the customer both indicate that the TSI that was the subject of the TS session was successfully resolved. The indication of success may be binary (i.e., the TS session was successful or unsuccessful) or may be denoted on a scale, e.g., a scale from 1-10, where 1 is not successful, 2-9 is partially successful, and 10 is completely successful.

Further, the TS session may be tagged with a "successful tag". The successful tag may be added to metadata of this TS session. In the event that the indication of success is denoted on a scale, then the successful tag also includes that value.

In one or more embodiments, the TS session may be ended by the customer or by the TSP (e.g., by the customer not sending TS sentences for a pre-determined period of time, by the customer or TSP closing a communication session, etc.). Further, depending on how the TS session was conducted, ending the TS session may occur when the TSP and/or the customer closes a chat window, hangs up the phone, etc. The session may be ended in any other manner without departing from the scope of the invention.

Those skilled in the art will appreciate that the TSS may track all active TS sessions and determine whether they have ended; alternatively, the TSS may only track a subset of the TS sessions that are active on the TSS and determine when TS sessions in this subset have ended.

In one or more embodiments, if the TS session has ended, the checker may extract one or more keywords from the TS session. The purpose of the keyword extraction is to identify words (or phrases) that may be used by other modules/engines in the TSS to identify the TS session (as a historical TS session) in future. To that end, any mechanism for determining keywords may be used without departing from the scope of the invention. For example, the keywords may be determined by: (i) prompting the TSP to identify keywords, (ii) using a ML algorithm(s) to extract keywords from the TS session, and/or (iii) using (ii) to identify a set of keywords and then having the TSP confirm (or remove) the keywords that were identified to obtain a verified set of keywords. The keyword extraction may be implemented using any combination of the above mechanisms and/or any other mechanisms without departing from the scope of the invention. In one or more embodiments, the extracted keywords may also be added to the above-discussed TS session metadata.

Further, if the TS session has ended, the TS session (which corresponds all the correspondence between the customer and TSP) may be stored along with the TS session metadata in the shared storage. The TS session and TS session metadata may be stored in a native language and/or in a default language. Further, a "TS session index entry" for the TS session may be generated and stored in the TS session index, which is maintained in the shared storage. The TS session index includes content that enables efficient identification and retrieval of the TS session and TS session metadata from the shared storage.

In one or more embodiments, if the ended TS session needs to be distributed to other TSSs, the translator may determine whether the TS session (and the corresponding TS session metadata) is in a default language (in order to facilitate the sharing of the TS session between the TSSs). If not, the translator may translate them from the native language to the default language.

Further, before distributing the TS session to other TSSs, a determination may be made as to whether any modification to the TS session and/or TS session metadata is required in view of, for example, sharing compliance rules. In one or more embodiments, the sharing compliance rules may specify that (i) all or a portion of the TS session and/or TS session metadata may not be exported to other TSSs and/or (ii) all or a portion of the TS session and/or the TS session metadata must be modified prior to exporting the TS session and/or the TS session to other TSSs. For example, based on the sharing compliance rules, (i) usernames and passwords may be removed, and (ii) certain types of questions and responses may be removed. As yet another example, based on the sharing compliance rules, certain portions of the TS session and/or TS session metadata may be modified, in which all personal identifiers may be redacted, removed, and replaced with anonymized identifiers. In this manner, the TS session and/or TS session metadata can still be used but no personal information is exchanged.

In one or more embodiments, if the result of the determination is NO, the TS session may be tagged with an "unsuccessful tag". The unsuccessful tag may be added to this TS session's metadata. In the event that the indication of success is denoted on a scale, then the unsuccessful tag also includes that value. Similar to the above-discussed metadata, the metadata of this TS session may also include one or more keywords from this TS session.

In Step 322, as a result of the second determination in Step 320 being YES, the checker notifies the recommendation engine that the TS request is resolved by the provided fix. In one or more embodiments, the checker may solicit feedback from the TSP about, for example (but not limited to): whether a given TS session was successful, a ranking of the success of a given TS session in resolving the TS request, whether the fix was helpful in ultimately resolving the TS request, etc.

For example, the customer may provide feedback (following the end of the TS session) to the TSP indicating that the TS request (e.g., the subject of the TS session) is resolved by the provided fix. The TSP then notifies, via the GUI, the checker that the TS session was successful. Based on this notification, the checker infers that the TS request is resolved by the provided fix and then notifies the recommendation engine.

In one or more embodiments, rather than soliciting feedback from the TSP, the checker may monitor the client to infer, for example (but not limited to): whether a given TS session was successful, a ranking of the success of a given TS session in resolving the TS request, whether the fix was helpful in ultimately resolving the TS request, etc. As a result of the monitoring, the checker may infer that the TS request is resolved by the provided fix and then notifies the recommendation engine.

In Step 324, based on the notification received from the checker in Step 322, the recommendation engine notifies the shared storage (more specifically, the agent of the shared storage) that the request is resolved by the provided fix. In one or more embodiments, based on the received notification, the agent may update both the decision tree and solution tree accordingly, for example, to resolve the same or similar TS requests in future.

In one or more embodiments of the invention, the method may end following Step 324.

In Step 326, as a result of the second determination in Step 320 being NO, the checker notifies the recommendation engine that the TS request is not resolved by the provided fix. In one or more embodiments, the checker may solicit feedback from the TSP about, for example (but not limited to): whether a given TS session was unsuccessful, the reason why the fix was unhelpful in ultimately resolving the TS request, etc.

For example, the customer may provide feedback (following the end of the TS session) to the TSP indicating that the TS request is not resolved by the provided fix. The TSP then notifies, via the GUI, the checker that the TS session was unsuccessful. Based on this notification, the checker infers that the TS request is not resolved by the provided fix and then notifies the recommendation engine.

In one or more embodiments, rather than soliciting feedback from the TSP, the checker may monitor the client to infer, for example (but not limited to): whether a given TS session was unsuccessful, the reason why the fix was unhelpful in ultimately resolving the TS request, etc. As a result of the monitoring, the checker may infer that the TS request is not resolved by the provided fix and then notifies the recommendation engine.

In Step 328, based on the notification received from the checker in Step 326, the recommendation engine notifies the shared storage (more specifically, the agent of the shared storage) that the request is not resolved by the provided fix. In one or more embodiments, based on the received notification, the agent may update both the decision tree and solution tree accordingly, for example, to notify the vendor.

Thereafter, in order to obtain a second fix (e.g., another fix) for the same TS request or another fix for a similar request from the shared storage, the recommendation engine may make an API call (including the relevant data and information from the TS request and TS request tag from) to the agent of the shared storage.

Based on receiving the API call from the recommendation engine and using the data provided with it, the agent may perform a search within the decision tree to identify another fix that resolves the customer's issue specified in the TS request. As a result of the search, the agent may identify (or may not identify) the exact fix that is needed to resolve the customer's issue. If the agent could not identify any fix for the issue (e.g., because there is still no fix available for this type of issue), the agent may then use other parameters available in the received relevant data (i) to perform an updated search and (ii) to identify the most relevant fix for the issue.

As a response to the API call, the agent may send the identified fix (either the exact fix or the most relevant fix) as another fix to the recommendation engine. Similar to the fix obtain in Step 308 of FIG. 3.1, the second fix may also specify a solution step(s) that the TSP needs to initiate (or follow) (i) in order to manage the ongoing TS session more properly and (ii) in order to resolve the TS request. Thereafter, (i) the recommendation engine may store the second fix in the storage (temporarily or permanently) and (ii) the method proceeds to Step 310, where the recommendation engine provide the second fix to the checker.

Figure 4:
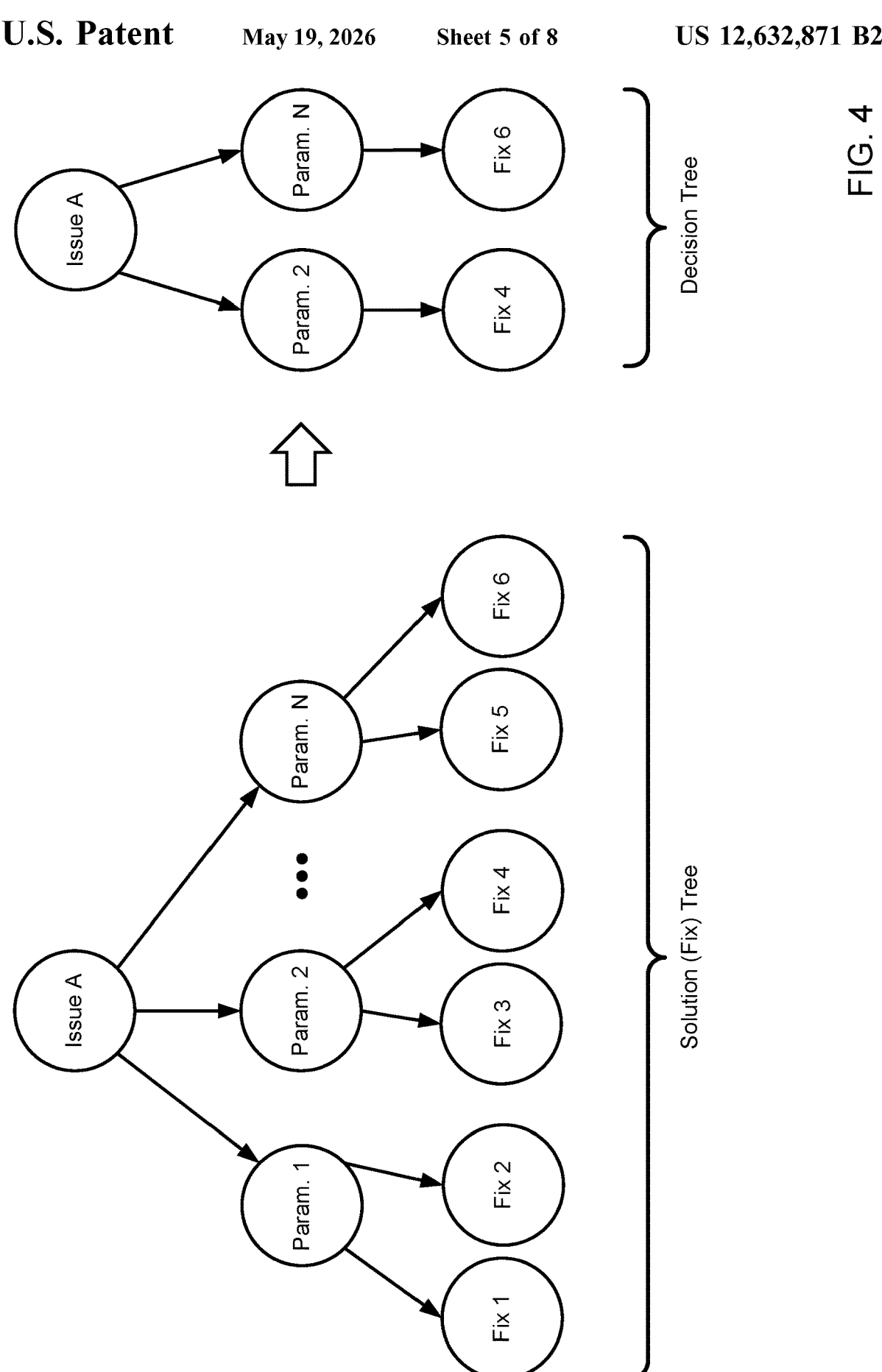
FIG. 4 shows diagrams of a solution tree and a decision tree in accordance with one or more embodiments of the invention.

Turning now to FIG. 4, FIG. 4 shows diagrams of a solution (fix) tree and a decision tree in accordance with one or more embodiments of the invention. In one or more embodiments, the solution tree may include, for example (but not limited to): an identifier of an issue (e.g., Issue A), an identifier of a parameter (e.g., Param. 1, Param. 2, etc.), an identifier of a fix (e.g., Fix 1, Fix 2, etc.), etc.

For example, consider a scenario where the TS request is "display screen goes blank". In this scenario, Issue A is "display screen goes blank" and corresponding parameters for Issue A are: (i) Param. 1: v1.2 of Application A is not executing properly, (ii) Param. 2: Application A is upgraded to v1.5, (iii) Param. N: unexpected activity is detected in the accelerometer. Further, in this scenario, corresponding fixes for each parameter are: (i) Fix 1: disable "two-sided view" setting in v1.2 of Application A, (ii) Fix 2: download and install "rxdfscreen_v1.2.dll" driver from the corresponding solution service, and then restart your computing device, (iii) Fix 3: remove and re-install v1.5 of Application A, and then restart your computing device, (iv) Fix 4: disable "night mode" setting in v1.5 of Application A, (v) Fix 5: shut down your computing device, disconnect the power supply, and replace the accelerometer, and (vi) Fix 6: upgrade the current version of your OS to OS v.12.

In this scenario, based on receiving an API call from the recommendation engine and using the data (e.g., relevant data, details of the TS request and TS request tag, etc.) provided within the API call, the agent may derive the decision tree from the solution tree. Comparing to the solution tree, the decision tree is more customer-specific and it is a subset of the solution tree. As indicated, based on the data provided within the API call, the agent of the shared storage (e.g., 130, FIG. 1) derived the decision tree as: (i) Issue A is "display screen goes blank", (i) Param. 2: Application A is upgraded to v1.5, (ii) Param. N: unexpected activity is detected in the accelerometer, (iii) Fix 4: disable "night mode" setting in v1.5 of Application A, and (iv) Fix 6: upgrade the current version of your OS to OS v.112. Thereafter, the agent may perform a search within the decision tree to identify a fix that resolves Issue A.

Start of Example

The following section describes an example of one or more embodiments. The example, illustrated in FIGS. 5.1 and 5.2, is not intended to limit the scope of the embodiments disclosed herein and is independent from any other examples discussed in this application.

Turning now to FIG. 5.1, FIG. 5.1 shows an exemplary visual stream (from a perspective of the TSP (i.e., TS Specialist A)) in accordance with one or more embodiments of the invention. In the example shown in FIG. 5.1, the visual stream includes (i) background processes (at Time 0, Time 10, and Time 12), (ii) TS sentences of Customer A (at Time 2, Time 5, Time 7, Time 9, and Time 14), and (iii) TSP sentences of TS Specialist A (at Time 1, Time 3, Time 4, Time 6, Time 8, Time 11, Time 13, and Time 15). In this example, the visual stream is for a TS session that starts at Time 0 and ends at Time 15 (i.e., the TSP ends the TS session), and the visual stream is displayed by TSS A's GUI.

At Time 0, the customer (i.e., Customer A) sends a TS request to TSS A, in which the request itself is not displayed in the visual stream. At Time 1, in response to receiving the TS request, the TSP sends a TSP sentence ("Thanks for reaching out to TS. How may I help you?"), which is displayed in the visual stream. At Time 1, the actual TS session starts. At Time 2, the customer replies with a TS sentence ("I am unable to connect to my VPN."), which is displayed in the visual stream. At Time 3-Time 8, additional TS and TSP sentences are exchanged, which are displayed in the visual stream. At Time 9, in response to the TSP's TSP sentence at Time 8, the customer reiterates the issue and sends a TS sentence ("But I am unable to connect to my VPN!!"), which is displayed in the visual stream. After receiving this TS sentence and in order to change the course of the ongoing TS session (in a positive way), TSS A obtains application logs and system logs of the customer's computing device (in which the logs are not displayed in the visual stream). Based on the logs, TSS A obtains a fix for the same request (received at Time 0) from the shared storage. TSS A infers that the fix includes the following four solution steps: (i) check your network connectivity, (ii) close all the applications executing on the computing device, (iii) update "VPN_driver_v1.dll" to the latest released version provided by the solution service, and (iv) restart your computing device.

TSS A then make a determination whether any of the solution steps have previously been applied to the customer's computing device. Based on the log files (which includes information about the customer's system state), TSS A infers that steps (i)-(ii) of the fix have previously been applied (by the customer) to the customer's computing device. For this reason, TSS A only provides (e.g., recommends) steps (iii)-(iv) of the fix to the TSP to resolve the TS request. At Time 11, in light of (iii)-(iv), TSP sends the following TSP sentence to the customer ("Please update "VPN_driver_v1.dll" to the latest released version and then restart your device"), which is displayed in the visual stream.

At Time 12, the customer applies the steps suggested by the TSP at Time 11. Thereafter, as a follow-up, at Time 13, the TSP sends a TSP sentence ("Are you able to connect now?"), which is displayed in the visual stream. At Time 14, the customer replies with a TS sentence ("Yes, finally! Thanks for the help."). At Time 15, as a courtesy, the TSP replies with the TSP sentence ("Great! Once again, thank you for reaching out. We look forward to helping you out more as and when you need it. Have a wonderful day!"), which is displayed in the visual stream. The TS session may then be ended by the TSP and TSS A may notify the shared storage that the request is resolved by the provided fix. Based on the received notification, the shared storage may update its decision and solution trees accordingly to resolve the same or similar TS requests in future.

Turning now to FIG. 5.2, FIG. 5.2 shows an exemplary visual stream (from a perspective of the customer) in accordance with one or more embodiments of the invention. In the example shown in FIG. 5.2, the visual stream includes (i) background processes (at Time 0 and Time 12), (ii) TS sentences of Customer A (at Time 2, Time 5, Time 7, Time 9, and Time 14), and (iii) TSP sentences of TS Specialist A (at Time 1, Time 3, Time 4, Time 6, Time 8, Time 11, Time 13, and Time 15). In this example, the visual stream is for the TS session that starts at Time 0 and ends at Time 15 (i.e., the TSP ends the TS session), and the visual stream is displayed by the client's GUI.

At Time 0, the customer sends the TS request to TSS A, in which the request itself is not displayed in the visual stream. In response to the TS request, at Time 1, the TSP sends the TSP sentence ("Thanks for reaching out to TS. How may I help you?"), which is displayed in the visual stream. At Time 2, the customer replies with the TS sentence ("I am unable to connect to my VPN."), which is displayed in the visual stream. At Time 3-Time 9 and Time 11, additional TS and TSP sentences are exchanged, which are displayed in the visual stream. At Time 12, the customer applies the steps suggested by the TSP at Time 11. Thereafter, as a follow-up, at Time 13, the TSP sends the TSP sentence ("Are you able to connect now?"), which is displayed in the visual stream. At Time 14, the customer replies with the TS sentence ("Yes, finally! Thanks for the help."). At Time 15, as a courtesy, the TSP replies with the TSP sentence ("Great! Once again, thank you for reaching out. We look forward to helping you out more as and when you need it. Have a wonderful day!"), which is displayed in the visual stream. The TS session may then be ended by the TSP.

End of Example

Turning now to FIG. 6, FIG. 6 shows a diagram of a computing device in accordance with one or more embodiments of the invention.

In one or more embodiments of the invention, the computing device (600) may include one or more computer processors (612), non-persistent storage (604) (e.g., volatile memory, such as RAM, cache memory), persistent storage (606) (e.g., a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a technical support (TS) conversation, the method comprising:

receiving, by a processor of a technical support system (TSS), a TS request from a user of a client device (CD), wherein the user sends the TS request after an alert is triggered for the CD and an issue is occurred in the CD, wherein the issue is overheating of a processing unit (PU) of the CD, wherein the alert specifies that a recommended maximum PU operating temperature is exceeded, and wherein the alert is defined by a vendor of the CD based on a data protection policy;

generating, in response to the TS request and by the processor, a TS request tag, wherein the TS request tag specifies a plurality of keywords from the TS request;

obtaining, after generating the TS request tag and by the processor, a log file associated with an application executing on the CD, wherein the TS request specifies information related to the issue, information related to the alert, and an identifier of the CD;

analyzing, by the processor and using a trained machine learning (ML) model, the log file to extract relevant data, wherein the trained ML model is trained using application logs and system logs from a previous TS conversation of a plurality of previous TS conversations to provide an accurate speech-to-text conversion while managing the TS conversation, wherein the trained ML model is periodically re-trained using feedback derived from the plurality of previous TS conversations, wherein the feedback comprises a plurality of TS request tags associated with the plurality of previous TS conversations, wherein the feedback further comprises a plurality of success scores associated with the plurality of previous TS conversations, wherein the feedback is used to improve a performance of the trained ML model, wherein the relevant data specifies a version of the application, a version of an operating system (OS), a type of the OS, an identifier of the OS, and a product identifier of the application, wherein the TSS and the CD are operatively connected to each other over a combination of wired and wireless connections;

obtaining, based on the relevant data, a fix from a storage device, wherein the fix comprises a plurality of steps;

analyzing the log file to make a first determination that a first step of the plurality of steps has previously been applied to the CD;

initiating, based on the first determination, display of a second step of the plurality of steps using a graphical user interface (GUI) accessible to a TS entity, wherein the second step has not been applied to the CD, wherein the GUI is displayed on a display of a computing device, wherein the display shows the second step in a native language format that would allow the TS entity to easily read and parse the second step for changing a course of the conversation to improve an experience of the user with the CD;

making, after the initiating and by monitoring the CD, a second determination that the TS request is not resolved using the fix;

notifying, based on the second determination, the storage device that the TS request is not resolved by the fix; and receiving, based on the notifying, a second fix from the storage device, wherein the second fix is related to a second TS request that is similar to the TS request, wherein receiving the second fix from the storage device comprises:

transmitting an Application Programming Interface (API) call to an agent of the storage device, wherein the API call comprises the relevant data and the TS request tag;

performing, based on the API call, a search within a decision tree to identify the second fix.

2. The method of claim 1, wherein the storage device comprises a fix tree database, wherein the storage device provides the fix from the fix tree database, and wherein, upon receiving the notification, the storage device updates the fix tree database and provides the second fix from the updated fix tree database.

3. The method of claim 1, wherein the log file comprises an application log or a system log, wherein the application log specifies at least the CD's display resolution configuration, and wherein the system log specifies at least an amount of storage used by an application.

4. The method of claim 1, wherein the first step of the plurality of steps specifies closing an application executing on the CD.

5. The method of claim 4, wherein the second step of the plurality of steps specifies restarting the CD.

6. A non-transitory computer readable medium comprising computer readable program code, which when executed by a computer processor enables the computer processor to perform a method for managing a technical support (TS) conversation, the method comprising:

receiving, by the processor of a technical support system (TSS), a TS request from a user of a client device (CD), wherein the user sends the TS request after an alert is triggered for the CD and an issue is occurred in the CD, wherein the issue is overheating of a processing unit (PU) of the CD, wherein the alert specifies that a recommended maximum PU operating temperature is exceeded, and wherein the alert is defined by a vendor of the CD based on a data protection policy;

generating, in response to the TS request and by the processor, a TS request tag, wherein the TS request tag specifies a plurality of keywords from the TS request;

obtaining, after generating the TS request tag and by the processor, a log file associated with an application executing on the CD, wherein the TS request specifies information related to the issue, information related to the alert, and an identifier of the CD;

analyzing, by the processor and using a trained machine learning (ML) model, the log file to extract relevant data, wherein the trained ML model is trained using application logs and system logs from a previous TS conversation of a plurality of previous TS conversations to provide an accurate speech-to-text conversion while managing the TS conversation, wherein the trained ML model is periodically re-trained using feedback derived from the plurality of previous TS conversations, wherein the feedback comprises a plurality of TS request tags associated with the plurality of previous TS conversations, wherein the feedback further comprises a plurality of success scores associated with the plurality of previous TS conversations, wherein the feedback is used to improve a performance of the trained ML model, wherein the relevant data specifies a version of the application, a version of an operating system (OS), a type of the OS, an identifier of the OS, and a product identifier of the application, wherein the TSS and the CD are operatively connected to each other over a combination of wired and wireless connections;

obtaining, based on the relevant data, a fix from a storage device, wherein the fix comprises a plurality of steps;

analyzing the log file to make a first determination that a first step of the plurality of steps has previously been applied to the CD;

initiating, based on the first determination, display of a second step of the plurality of steps using a graphical user interface (GUI) accessible to a TS entity, wherein the second step has not been applied to the CD, wherein the GUI is displayed on a display of a computing device, wherein the display shows the second step in a native language format that would allow the TS entity to easily read and parse the second step for changing a course of the conversation to improve an experience of the user with the CD;

making, after the initiating and by monitoring the CD, a second determination that the TS request is not resolved using the fix;

notifying, based on the second determination, the storage device that the TS request is not resolved by the fix; and receiving, based on the notifying, a second fix from the storage device, wherein the second fix is related to a second TS request that is similar to the TS request, wherein receiving the second fix from the storage device comprises:

transmitting an Application Programming Interface (API) call to an agent of the storage device, wherein the API call comprises the relevant data and the TS request tag;

performing, based on the API call, a search within a decision tree to identify the second fix.

7. The non-transitory computer readable medium of claim 6, wherein the storage device comprises a fix tree database, wherein the storage device provides the fix from the fix tree database, and wherein, upon receiving the notification, the storage device updates the fix tree database and provides the second fix from the updated fix tree database.

8. The non-transitory computer readable medium of claim 6, wherein the log file comprises an application log or a system log, wherein the application log specifies at least the CD's display resolution configuration, and wherein the system log specifies at least an amount of storage used by an application.

9. The non-transitory computer readable medium of claim 6, wherein the first step of the plurality of steps specifies closing an application executing on the CD.

10. The non-transitory computer readable medium of claim 9, wherein the second step of the plurality of steps specifies restarting the CD.

11. A system for managing a technical support (TS) conversation, the system comprising:

a processor comprising circuitry;

a memory comprising instructions, which when executed perform a method, the method comprising:

receiving, by the processor of a technical support system (TSS), a TS request from a user of a client device (CD), wherein the user sends the TS request after an alert is triggered for the CD and an issue is occurred in the CD, wherein the issue is overheating of a processing unit (PU) of the CD, wherein the alert specifies that a recommended maximum PU operating temperature is exceeded, and wherein the alert is defined by a vendor of the CD based on a data protection policy;

generating, in response to the TS request and by the processor, a TS request tag, wherein the TS request tag specifies a plurality of keywords from the TS request;

obtaining, after generating the TS request tag and by the processor, a log file associated with an application executing on the CD, wherein the TS request specifies information related to the issue, information related to the alert, and an identifier of the CD;

analyzing, by the processor and using a trained machine learning (ML) model, the log file to extract relevant data, wherein the trained ML model is trained using application logs and system logs from a previous TS conversation of a plurality of previous TS conversations to provide an accurate speech-to-text conversion while managing the TS conversation, wherein the trained ML model is periodically re-trained using feedback derived from the plurality of previous TS conversations, wherein the feedback comprises a plurality of TS request tags associated with the plurality of previous TS conversations, wherein the feedback further comprises a plurality of success scores associated with the plurality of previous TS conversations, wherein the feedback is used to improve a performance of the trained ML model, wherein the relevant data specifies a version of the application, a version of an operating system (OS), a type of the OS, an identifier of the OS, and a product identifier of the application, wherein the TSS and the CD are operatively connected to each other over a combination of wired and wireless connections;

obtaining, based on the relevant data, a fix from a storage device, wherein the fix comprises a plurality of steps;

analyzing the log file to make a first determination that a first step of the plurality of steps has previously been applied to the CD;

initiating, based on the first determination, display of a second step of the plurality of steps using a graphical user interface (GUI) accessible to a TS entity, wherein the second step has not been applied to the CD, wherein the GUI is displayed on a display of a computing device, wherein the display shows the second step in a native language format that would allow the TS entity to easily read and parse the second step for changing a course of the conversation to improve an experience of the user with the CD;

making, after the initiating and by monitoring the CD, a second determination that the TS request is not resolved using the fix;

notifying, based on the second determination, the storage device that the TS request is not resolved by the fix; and receiving, based on the notifying, a second fix from the storage device, wherein the second fix is related to a second TS request that is similar to the TS request, wherein receiving the second fix from the storage device comprises:

transmitting an Application Programming Interface (API) call to an agent of the storage device, wherein the API call comprises the relevant data and the TS request tag;

performing, based on the API call, a search within a decision tree to identify the second fix.

* * * * *